(12) United States Patent
Sharma et al.

(10) Patent No.: US 8,549,546 B2
(45) Date of Patent: Oct. 1, 2013

(54) METHOD AND SYSTEM FOR CONTAINMENT OF USAGE OF LANGUAGE INTERFACES

(75) Inventors: Rosen Sharma, Los Gatos, CA (US); Bakul Shah, Los Altos, CA (US); E. John Sebes, Menlo Park, CA (US)

(73) Assignee: McAfee, Inc., Santa Clara, CA (US)

( * ) Notice: Subject to any disclaimer, the term of this patent is extended or adjusted under 35 U.S.C. 154(b) by 266 days.

(21) Appl. No.: 12/946,081

(22) Filed: Nov. 15, 2010

(65) Prior Publication Data

US 2011/0077948 A1   Mar. 31, 2011

Related U.S. Application Data

(62) Division of application No. 10/739,230, filed on Dec. 17, 2003, now Pat. No. 7,840,968.

(51) Int. Cl.
G06F 21/00 (2013.01)

(52) U.S. Cl.
USPC ........... 719/330; 719/313; 719/320; 719/328; 726/26; 726/27; 717/100

(58) Field of Classification Search
None
See application file for complete search history.

(56) References Cited

U.S. PATENT DOCUMENTS

| | | |
|---|---|---|
| 4,688,169 A | 8/1987 | Joshi |
| 4,982,430 A | 1/1991 | Frezza et al. |
| 5,155,847 A | 10/1992 | Kirouac et al. |
| 5,222,134 A | 6/1993 | Waite et al. |
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |
| 5,778,226 A | 7/1998 | Adams et al. |
| 5,778,349 A | 7/1998 | Okonogi |
| 5,787,427 A | 7/1998 | Benantar et al. |
| 5,842,017 A | 11/1998 | Hookway et al. |
| 5,907,709 A | 5/1999 | Cantey et al. |
| 5,907,860 A | 5/1999 | Garibay et al. |
| 5,926,832 A | 7/1999 | Wing et al. |
| 5,974,149 A | 10/1999 | Leppek |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |

(Continued)

FOREIGN PATENT DOCUMENTS

| | | |
|---|---|---|
| EP | 1 482 394 A2 | 12/2004 |
| EP | 2 037 657 A1 | 3/2009 |

(Continued)

OTHER PUBLICATIONS

Barrantes et al., "Randomized Instruction Set Emulation to Disrupt Binary Code Injection Attacks," Oct. 27-31, 2003, ACM, pp. 281-289.

(Continued)

*Primary Examiner* — Qing Wu
(74) *Attorney, Agent, or Firm* — Patent Capital Group

(57) ABSTRACT

Client software is modified by a translator to use unique variant of linguistic interface of a service. An interceptor pre-processes subsequent client service requests from translated unique linguistic interface to standard linguistic interface implemented by service. Usage of linguistic interfaces of service is contained, rendering service incapable of executing arbitrary input, even if such input is crafted specifically for the service interface.

30 Claims, 23 Drawing Sheets

(56) References Cited

U.S. PATENT DOCUMENTS

| | | | |
|---|---|---|---|
| 6,141,698 A | 10/2000 | Krishnan et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,587,877 B1 | 7/2003 | Douglis et al. |
| 6,611,925 B1 | 8/2003 | Spear |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,346,781 B2 | 3/2008 | Cowle et al. |
| 7,349,931 B2 | 3/2008 | Horne |
| 7,350,204 B2 | 3/2008 | Lambert et al. |
| 7,353,501 B2 | 4/2008 | Tang et al. |
| 7,363,022 B2 | 4/2008 | Whelan et al. |
| 7,370,360 B2 | 5/2008 | van der Made |
| 7,406,517 B2 | 7/2008 | Hunt et al. |
| 7,441,265 B2 | 10/2008 | Staamann et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,603,552 B1 | 10/2009 | Sebes et al. |
| 7,607,170 B2 | 10/2009 | Chesla |
| 7,657,599 B2 | 2/2010 | Smith |
| 7,669,195 B1 | 2/2010 | Qumei |
| 7,685,635 B2 | 3/2010 | Vega et al. |
| 7,698,744 B2 | 4/2010 | Fanton et al. |
| 7,703,090 B2 | 4/2010 | Napier et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes et al. |
| 7,895,573 B1 | 2/2011 | Bhargava et al. |
| 7,908,653 B2 | 3/2011 | Brickell et al. |
| 7,937,455 B2 | 5/2011 | Saha et al. |
| 7,966,659 B1 | 6/2011 | Wilkinson et al. |
| 7,996,836 B1 | 8/2011 | Mccorkendale et al. |
| 8,015,388 B1 | 9/2011 | Rihan et al. |
| 8,015,563 B2 | 9/2011 | Araujo et al. |
| 8,195,931 B1 | 6/2012 | Sharma et al. |
| 8,234,713 B2 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,381,284 B2 | 2/2013 | Dang et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1 | 7/2002 | Mastin et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0073894 A1 | 4/2003 | Chiang et al. |
| 2003/0074552 A1 | 4/2003 | Olkin et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0143749 A1 | 7/2004 | Tajali et al. |
| 2004/0167906 A1 | 8/2004 | Smith et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2005/0018651 A1 | 1/2005 | Yan et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |

| | | |
|---|---|---|
| 2007/0011746 A1 | 1/2007 | Malpani et al. |
| 2007/0028303 A1 | 2/2007 | Brennan |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0294703 A1 | 11/2008 | Craft et al. |
| 2008/0301770 A1 | 12/2008 | Kinder |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0249053 A1 | 10/2009 | Zimmer et al. |
| 2009/0249438 A1 | 10/2009 | Litvin et al. |
| 2009/0320140 A1 | 12/2009 | Sebes et al. |
| 2010/0071035 A1 | 3/2010 | Budko et al. |
| 2010/0100970 A1 | 4/2010 | Chowdhury et al. |
| 2010/0114825 A1 | 5/2010 | Siddegowda |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047543 A1 | 2/2011 | Mohinder |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2012/0030731 A1 | 2/2012 | Bhargava et al. |
| 2012/0030750 A1 | 2/2012 | Bhargava et al. |
| 2012/0278853 A1 | 11/2012 | Chowdhury et al. |
| 2012/0290827 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0117823 A1 | 5/2013 | Dang et al. |

FOREIGN PATENT DOCUMENTS

| | | |
|---|---|---|
| EP | 2599026 | 6/2013 |
| EP | 2599276 | 6/2013 |
| WO | WO 98/44404 | 10/1998 |
| WO | WO 2011/059877 | 5/2001 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2012/015485 | 2/2012 |
| WO | WO 2012/015489 | 2/2012 |

OTHER PUBLICATIONS

Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.

Gaurav et al., "Countering Code-Injection Attacks with Instruction-Set Randomization," Oct. 27-31, 2003, ACM, pp. 272-280.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Tal Garfinkel, et al., "Terra: A Virtual Machine-Based Platform for Trusted Computing," XP-002340992, SOSP'03, Oct. 19-22, 2003, 14 pages.

U.S. Appl. No. 12/946,344, entitled "Method and System for Containment of Usage of Language Interfaces," filed Nov. 15, 2010, Inventor(s) Rosen Sharma, et al.

U.S. Appl. No. 13/012,138, entitled "System and Method for Selectively Grouping and Managing Program Files," filed Jan. 24, 2011, Inventor(s) Rishi Bhargava, et al.

U.S. Appl. No. 13/037,988, entitled "System and Method for Botnet Detection by Comprehensive Email Behavioral Analysis," filed Mar. 1, 2011, Inventor(s) Sven Krasser, et al.

IA-32 Intel® Architecture Software Developer's Manual, vol. 3B; Jun. 2006; pp. 13, 15, 22 and 145-146.

Notification of International Preliminary Report on Patentability and Written Opinion mailed May 24, 2012 for International Application No. PCT/US2010/055520, 5 pages.

Sailer et al., sHype: Secure Hypervisor Approach to Trusted Virtualized Systems, IBM research Report, Feb. 2, 2005, 13 pages.

U.S. Appl. No. 13/558,181, entitled "Method and Apparatus for Process Enforced Configuration Management," filed Jul. 25, 2012, Inventor(s) Rishi Bhargava et al.

U.S. Appl. No. 13/558,227, entitled "Method and Apparatus for Process Enforced Configuration Management," filed Jul. 25, 2012, Inventor(s) Rishi Bhargava et al.

U.S. Appl. No. 13/558,277, entitled "Method and Apparatus for Process Enforced Configuration Management," filed Jul. 25, 2012, Inventor(s) Rishi Bhargava et al.

Kurt Gutzmann, "Access Control and Session Management in the HTTP Environment," Jan./Feb. 2001, pp. 26-35, IEEE Internet Computing.

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.
U.S. Appl. No. 11/060,683, entitled "Distribution and Installation of Solidified Software on a Computer," filed Feb. 16, 2005, Inventor(s): Bakul Shah et al.
U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.
U.S. Appl. No. 11/182,320, entitled "Classification of Software on Networked Systems," filed Jul. 14, 2005, Inventor(s): E. John Sebes et al.
U.S. Appl. No. 11/400,085, entitled "Program-Based Authorization," filed Apr. 7, 2006, Inventor(s): Rishi Bhargava et al.
U.S. Appl. No. 11/437,317, entitled "Connectivity-Based Authorization," filed May 18, 2006, Inventor(s): E. John Sebes et al.
U.S. Appl. No. 12/290,380, entitled "Application Change Control," filed Oct. 29, 2008, Inventor(s): Rosen Sharma et al.
U.S. Appl. No. 12/008,274, entitled Method and Apparatus for Process Enforced Configuration Management, filed Jan. 9, 2008, Inventor(s): Rishi Bhargava et al.
U.S. Appl. No. 12/291,232, entitled "Method of and System for Computer System State Checks," filed Nov. 7, 2008, inventor(s): Rishi Bhargava et al.
U.S. Appl. No. 12/322,220, entitled "Method of and System for Malicious Software Detection Using Critical Address Space Protection," filed Jan. 29, 2009, Inventor(s): Suman Saraf et al.
U.S. Appl. No. 12/322,321, entitled "Method of and System for Computer System Denial-of-Service Protection," filed Jan. 29, 2009, Inventor(s): Suman Saraf et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/545,609, entitled "System and Method for Enforcing Security Policies in a Virtual Environment," filed Aug. 21, 2009, Inventor(s): Amit Dang et al.
U.S. Appl. No. 12/545,745, entitled "System and Method for Providing Address Protection in a Virtual Environment," filed Aug. 21, 2009, Inventor(s): Preet Mohinder.
Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
U.S. Appl. No. 12/615,521, entitled "System and Method for Preventing Data Loss Using Virtual Machine Wrapped Applications," filed Nov. 10, 2009, Inventor(s): Sonali Agarwal, et al.
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
U.S. Appl. No. 12/636,414, entitled "System and Method for Managing Virtual Machine Configurations," filed Dec. 11, 2009, Inventor(s): Harvinder Singh Sawhney, et al.
U.S. Appl. No. 12/839,856, entitled "Containment of Network Communication," filed Jul. 20, 2010, Inventor(s) E. John Sebes, et al.
U.S. Appl. No. 12/844,892, entitled "System and Method for Protecting Computer Networks Against Malicious Software," filed Jul. 28, 2010, Inventor(s) Rishi Bhargava, et al.
U.S. Appl. No. 12/844,964, entitled "System and Method for Network Level Protection Against Malicious Software," filed Jul. 28, 2010, Inventor(s) Rishi Bhargava, et al.
U.S. Appl. No. 12/880,125, entitled "System and Method for Clustering Host Inventories," filed Sep. 12, 2010, Inventor(s) Rishi Bhargava, et al.
U.S. Appl. No. 12/944,567, entitled "Classification of Software on Networked Systems," filed Nov. 11, 2010, Inventor(s) E. John Sebes, et al.
U.S. Appl. No. 12/903,993, entitled "Method and System for Containment of Usage of Language Interfaces," filed Oct. 13, 2010, Inventor(s) Rosen Sharma, et al.

Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.1st.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 a https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-antivirus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
U.S. Appl. No. 13/728,705, filed Dec. 27, 2012, entitled "Herd Based Scan Avoidance System in a Network Environment," Inventor(s) Venkata Ramanan, et al.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed oct. 11, 2011), 8 pages.
Shacham, et al., "On the Effectiveness of Address-Space Randomization," CCS'04, Oct. 25-29, 2004, Washington, D.C., Copyright 2004, 10 pages.
U.S. Appl. No. 13/271,102, filed Oct. 11, 2011, entitled System and Method for Critical Address Space Protection in a Hypervisor Environment, Inventors: Rajbir Bhattacharjee, et al.
International Search Report and Written Opinion mailed Dec. 14, 2012 for International Application No. 04796-1087WO, 9 pages.
U.S. Appl. No. 13/723,445, filed Dec. 21, 2012, entitled "System and Method for Enforcing Security Policies in a Virtual Environment," Inventor(s) Amit Dang, et al.
International Preliminary Report on Patentability and Written Opinion issued Jan. 29, 2013 for International Application No. PCT/US2011/020677 (9 pages).
International Preliminary Report on Patentability and Written Opinion issued Jan. 29, 2013 for International Application No. PCT/US2011/024869 (6 pages).
USPTO Jun. 5, 2013 Notice of Allowance from U.S. Appl. No. 11/437,317.
USPTO Jun. 10, 2013 Notice of Allowance from U.S. Appl. No. 12/976,159.
USPTO Aug. 5, 2013 Notice of Allowance from U.S. Appl. No. 12/903,993.
USPTO Aug. 9, 2013 Office Action from U.S. Appl. No. 12/946,344.

METHOD AND SYSTEM FOR CONTAINMENT OF USAGE OF LANGUAGE INTERFACES

RELATED APPLICATION

This Application is a divisional (and claims the benefit of priority under 35 U.S.C. §120 and §121) of U.S. Pat. No. 7,840,968, issued from U.S. application Ser. No. 10/739,230, filed Dec. 17, 2003, entitled "METHOD AND SYSTEM FOR CONTAINMENT OF USAGE OF LANGUAGE INTERFACES," Inventor(s) Rosen Sharma, et al. The disclosure of the prior patent is considered part of (and is incorporated by reference in) the disclosure of this application.

BACKGROUND

1. Field

Invention relates generally to computer systems, and in particular to controlling the use of computing resources by controlling language interfaces.

2. Related Art

Most information processing systems comprise hardware and software components with well-known interfaces, wherein the interfaces facilitate the use of the system components by other components specifically developed to use the interfaces. A common goal in practical computing comprises limiting the use of a specific system to software that the owners or operators of the system wish to use, disallowing the execution of arbitrary pieces of software on the system and the use of system resources by such arbitrary software, even if such software has been developed to use the interfaces provided by the system. However, this goal is difficult to achieve because of the impracticality of controlling the set of software that can attempt to execute on a given system. Furthermore, since the interfaces of most systems are well known, software with an opportunity to attempt execution or system usage will frequently succeed.

There are current techniques for limiting a given computing system such that only a specific set of software can execute on the system. Current techniques fall into the following categories: techniques for randomizing instruction sets; virtualization or mapping techniques; software encryption; and techniques for containing the use of functional interfaces and similar request-response interfaces including messaging interfaces. Encryption-based techniques rely on shared secrets used for cryptographic pre-execution checks, and fail to limit system usage once the pre-execution check succeeds. Randomized instruction set techniques generally rely on secret sharing schemes applied to functional interfaces, by using random secret data to transform a program's use of an interface's function names, keywords, instructions, command names, etc. Neither encryption or randomization has been used for programs that when executed compute or obtain new commands to execute. Virtualization avoids dependence on shared secrets but has been applied only to create variant name spaces for a fixed set of names of existing system resources such as memory addresses, file names, instruction operation codes, etc.

Accordingly, there is a need for a technique that is not based on validation checks, not limited by shared secrets, not limited to finite name space, and that applies to any linguistic representation and at all times, including cases where the running software computes or obtains new commands to execute.

SUMMARY

Present invention provides a method and system for containing the use of linguistic interfaces such that only a fixed set of software gains usage of a given system via a given linguistic interface. In one embodiment of the present invention, a translator modifies a body of software to use a unique variant of a linguistic interface, and an interceptor pre-processes subsequent invocations of the unique interface variant in order to re-translate the invocation to the standard language implemented by a standard system component. The interception and re-translation of service requests limits usage of the service to software that has been pre-translated to use the unique variant language.

The present invention can be used to contain the capabilities of any software comprising a linguistic interface (e.g. an interpreter, command shell, etc.), thereby rendering the software incapable of executing arbitrary input (e.g. directive, command, script, program) even if the input has been crafted specifically for that software's linguistic interface. Instead, in a contained system, an interpreter is capable of executing only a fixed set of input datasets or programs which are uniquely targeted at the individual system. Furthermore, the ability to create any additional uniquely targeted programs is a capability that is not present on the system.

DETAILED DESCRIPTION

Figure 1:
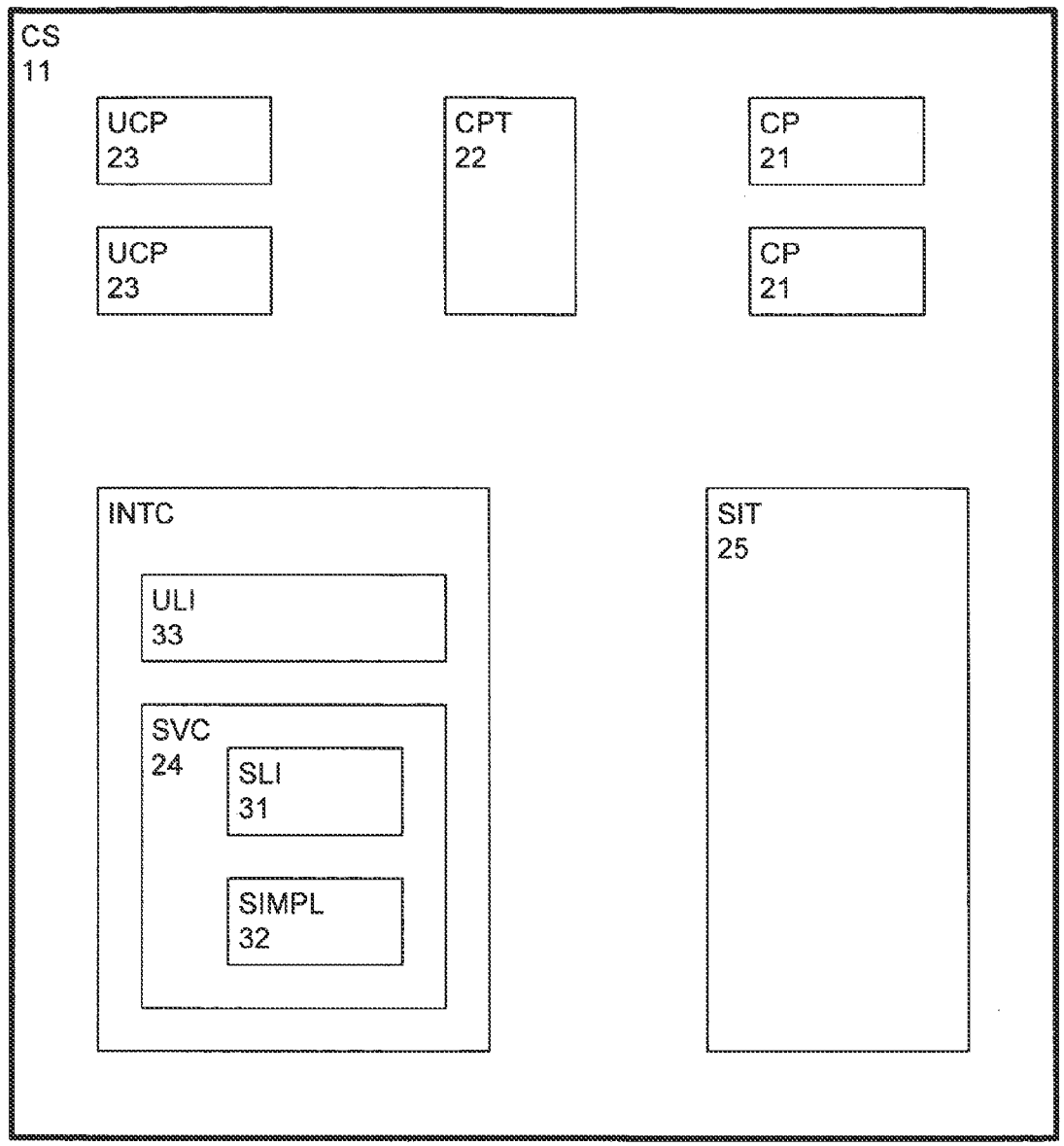
FIG. 1 is a block diagram illustrating a system for containment of usage of language interfaces, according to an embodiment of the present invention.

The following serves as a glossary of terms as used herein:

Service Interface (Hereinafter Also Referred to as Linguistic Interface):

An interface for use by a client of a service to submit a service request to an implementation of the service, wherein the client presents a dataset that conforms to a language specification (optionally expressed in terms of a grammar and a set of directives). A valid use of a linguistic interface comprises submitting (to the implementation of the interface) any of an infinite variety of linguistic statements that conform to the grammar of the language. This is in contrast to a functional interface comprising a finite number of distinct functions having one or more parameters of various kinds such that an instance of a valid use of the functional interface is a call to one of the functions with the correct kind of data items supplied for the function's parameters. A first linguistic interface is distinct from a second linguistic interface if the first linguistic interface comprises a grammar that is different from the grammar of the second linguistic interface, and/or if the first linguistic interface comprises a set of directives that is different from the set of directives of the second linguistic interface. A service interface is "standard" if it is disclosed publicly and/or is known as the primary interface of a service and/or is otherwise well-known.

Service:

A specification of a behavior for implementing a functionality, comprising accepting a request and providing a response to the request according to the specified functionality. A service may optionally be specified in terms of existing resources and/or be defined in terms of other services.

Service Implementation:

An implementation of a service, optionally embodied in a software interpreter, that consumes input comprising one or more directives and interprets the input in order to implement those directives by using services provided by hardware, or by other software running on a computer, or by software on other computers accessible via a data network. A first service implementation is equivalent to a second service implementation if for every service request the result of the interpretation of the first service implementation is the same as the result of the interpretation of the second service implementation (wherein the service requests are expressed in respective linguistic interfaces understood by the respective service implementations). In current practice, there are a variety of types of such interpreters; the present invention applies to any type of linguistic interpreter, including but not limited to the following:

Directives are expressed in a language designed for humans to type system commands on a console. The interpreter is a program called a command interpreter or command shell, while the input is called a shell script or batch file.

Directives are expressed in a language designed for programming. The interpreter is a program called an interpreter, while the input is called a program; sometimes the terms script, and scripting language are used.

Directives are executed by the interpreter by making direct use of the resources of the local computer and the services of its operating system, including OS services that enable the interpreter to make use of other services either on the local computer or on other computers accessible by a data network.

Directives are executed by the interpreter by means of executing a compiler to convert the program into a binary program for the local computer, and then executing the program on the local computer, typically including either hardware, or software-emulated hardware running on hardware. (This technique is sometimes called just-in-time or JIT compilation.)

Directives are executed by the interpreter using a translator for converting the program into a program in some other language, and passing the translated program to an implementation of that language.

Service Request:

An expression in the language of a linguistic interface. An expression in a linguistic interface may comprise a constant data, the constant data representing a word and/or a literal in the linguistic interface. In the context of a first service implementation (accepting input according to a first linguistic interface) and an equivalent second service implementation (accepting input according to a second linguistic interface), a first service request expressed in the first linguistic interface is equivalent to a second service request expressed in the second linguistic interface if the result of the first service implementation on the first service request is the same as the result of the second service implementation on the second service request. If the first service request comprises a first constant data and the second service request (equivalent to the first service request) comprises a second constant data, such that the first constant data corresponds to the second constant data when considering the second service request as a translation of the first service request, then the first constant data is said to be equivalent to the second constant data (within the context of the two linguistic interfaces).

Service Parameter Data:

A parameter in a service request, for passing to a service implementation. A service parameter data is a user input, a constant data, or a variable data, the variable data depending on a constant data or a user input via a code path in the program which generates the service request.

Client Program:

A program which makes use of a service using a linguistic interface. To do so, a client program formulates, and submits to the service implementation, a statement or expression (hereinafter also referred to as a "service request") in the language of the interface. (It is important to note that two service requests may be equivalent, but be expressed in two different linguistic interfaces.) The service implementation processes the submitted statement or expression producing one or more results such as: returning output data that indicates successful execution; returning output data that is the result of successful execution; returning output describing unsuccessful execution. A client program may perform such a submission one or more times. When a given client program makes multiple submissions, the client program is typically gathering external input and formulating submissions that form part of its processing of the input. A very important typical case of a single submission comprises an entire program in the interpreted language submitted for execution via the interpreter.

FIG. 1 is a block diagram illustrating a system for containment of usage of language interfaces, according to an embodiment of the present invention. Computing system (CS) 11 comprises one or more client programs (CP) 21 of a given service, a client program transformer (CPT) 22, one or more unique client programs (UCP) 23, a service implementation SVC 24 implementing a service used by a CP 21, a service interface transformer (SIT) 25 and an interceptor (INTC) 26. The SVC 24 comprises a standard linguistic interface (SLI) 31 and a service implementation (SIMPL) 32. The interceptor INTC 26 comprises a unique linguistic interface (ULI) 33 and SVC 24. SLI 31 and ULI 33 are instances of a linguistic interface. SIMPL 32 is an instance of a service implementation. CP 21 and UCP 23 are instances of client programs of a service.

Figure 2:
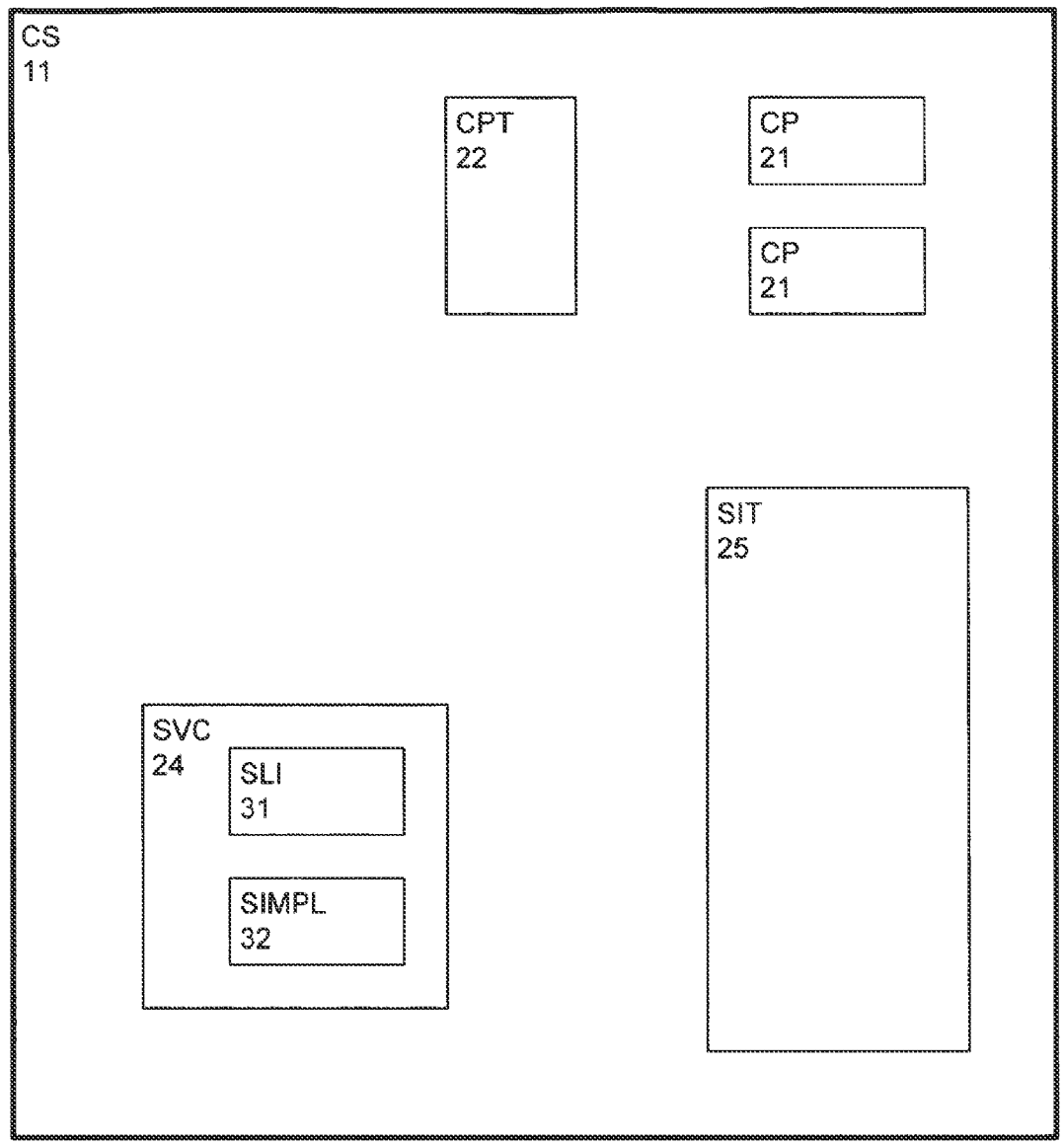
FIG. 2 is a block diagram illustrating a system for containment of usage of language interfaces before the client program transformer and the service interface transformer are operational, according to an embodiment of the present invention.
Figure 3A:
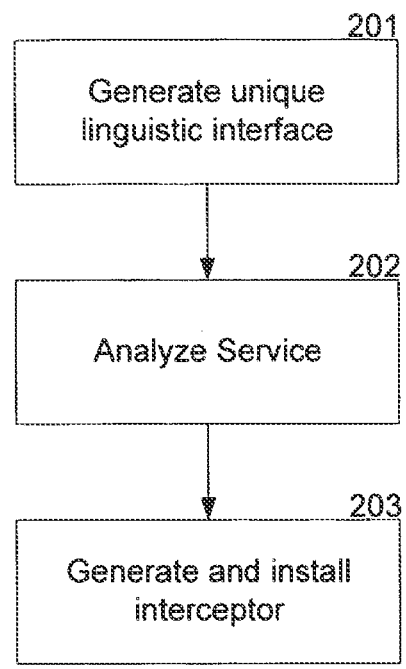
FIG. 3a is a flow chart illustrating the steps performed by the service interface transformer for the containment of usage of language interfaces, according to an embodiment of the present invention.
Figure 3B:
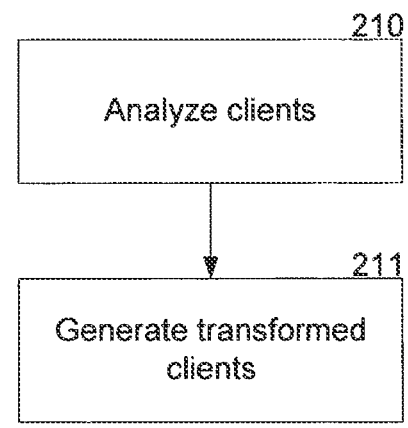
FIG. 3b is a flow chart illustrating the steps performed by the client program transformer for the containment of usage of language interfaces, according to an embodiment of the present invention.
Figure 3C:
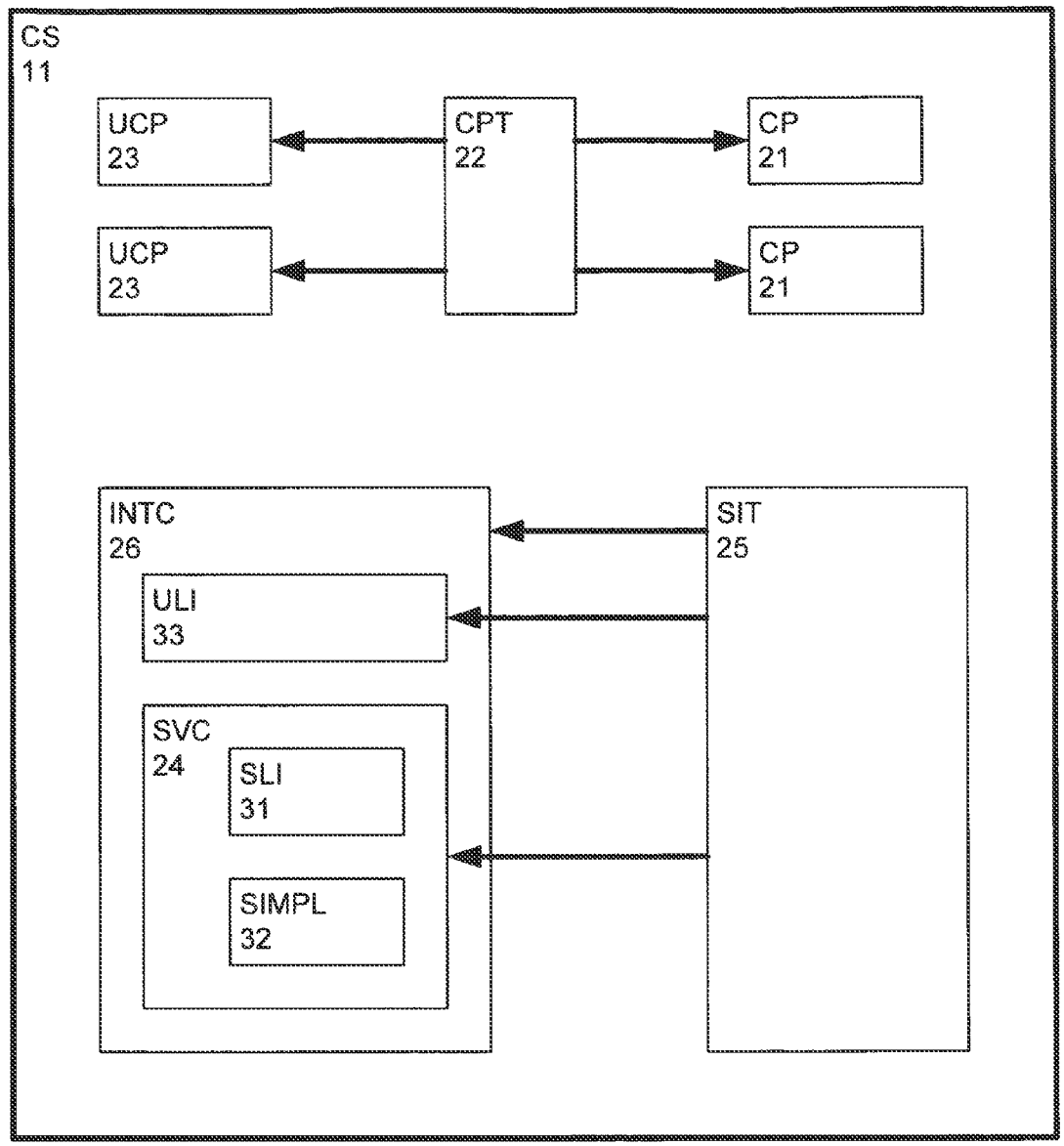
FIG. 3c is a block diagram illustrating a system for the containment of usage of language interfaces after the client program transformer and the service interface transformer have performed the steps shown in FIGS. 3a and 3b.
Figure 4:
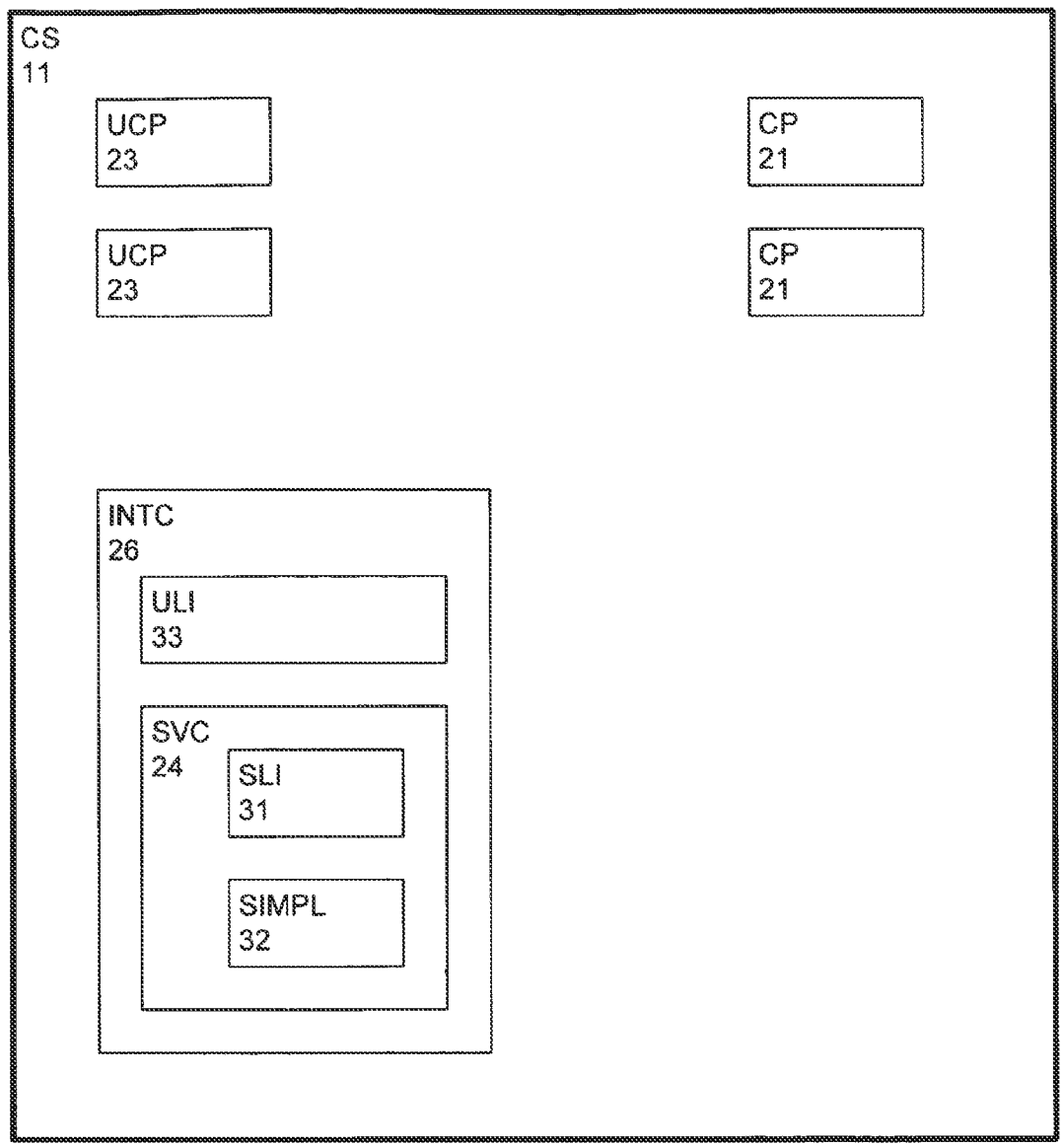
FIG. 4 is a block diagram illustrating the result of the final step of the "build phase" in a system for the containment of usage of language interfaces, wherein the interceptor and the client program transformer are removed from the system, according to an embodiment of the present invention.

FIGS. 2 through 4 illustrate the first of two phases of the present invention, the first being the "build phase" and the second being the "run phase." In the "build phase", the client program transformer CPT 22 and the service interface transformer SIT 25 are actors, while the interceptor INTC 26 and the unique linguistic interface ULI 33 are results of actions performed by the actors, as are the transformed clients UCP 23.

FIG. 2 is a block diagram illustrating a system for containment of usage of language interfaces before the client program transformer CPT 22 and the service interface transformer SIT 25 are operational, according to an embodiment of the present invention. The standard implementation of the service SVC 24 and its one or more clients CP 21 are present on the system CS 11.

FIG. 3a is a flow chart illustrating the steps performed by SIT 25 for the containment of usage of language interfaces, according to an embodiment of the present invention. SIT 25 generates 201 the unique linguistic interface ULI 33, analyzes 202 the service SVC 24 to determine how to install the interceptor INTC 26, and generates 203 and installs the interceptor to capture the input for SVC 24 and redirect it through ULI 33.

FIG. 3b is a flow chart illustrating the steps performed by the transformer CPT 22 for the containment of usage of language interfaces, according to an embodiment of the present invention. Transformer CPT 22 analyzes 210 the one or more clients CP 21, and generates 211 one or more transformed clients UCP 23, wherein the transformed clients UCP 23 are functionally identical to the standard clients CP 21 but instead use the unique interface ULI 33 to interact with the service SVC 24.

FIG. 3c is a block diagram illustrating a system for the containment of usage of language interfaces after the client program transformer CPT 22 and the service interface transformer SIT 25 have performed the steps shown in FIGS. 3a and 3b. Arrows indicate the analysis of the SVC 24 and the generation of the unique linguistic interface ULI 33 and the interceptor INTC 26 by the interface transformer SIT 25, as well as the analysis of the clients CP 21 and the generation of the transformed clients UCP 23 by the client transformer CPT 22.

FIG. 4 is a block diagram illustrating the result of the final step of the "build phase" in a system for the containment of usage of language interfaces, wherein the service interface transformer SIT 25 and the client program transformer CPT 22 are removed from the system CS 11, according to an embodiment of the present invention. The removal of the service interface transformer SIT 25 and client program transformer CPT 22 eliminates the ability for subsequent transformation of client programs CP 21 or re-generation of the interceptor INTC 26. The original client programs CP 21 may or may not be present; the unique clients UCP 23 are used instead.

Figure 5:
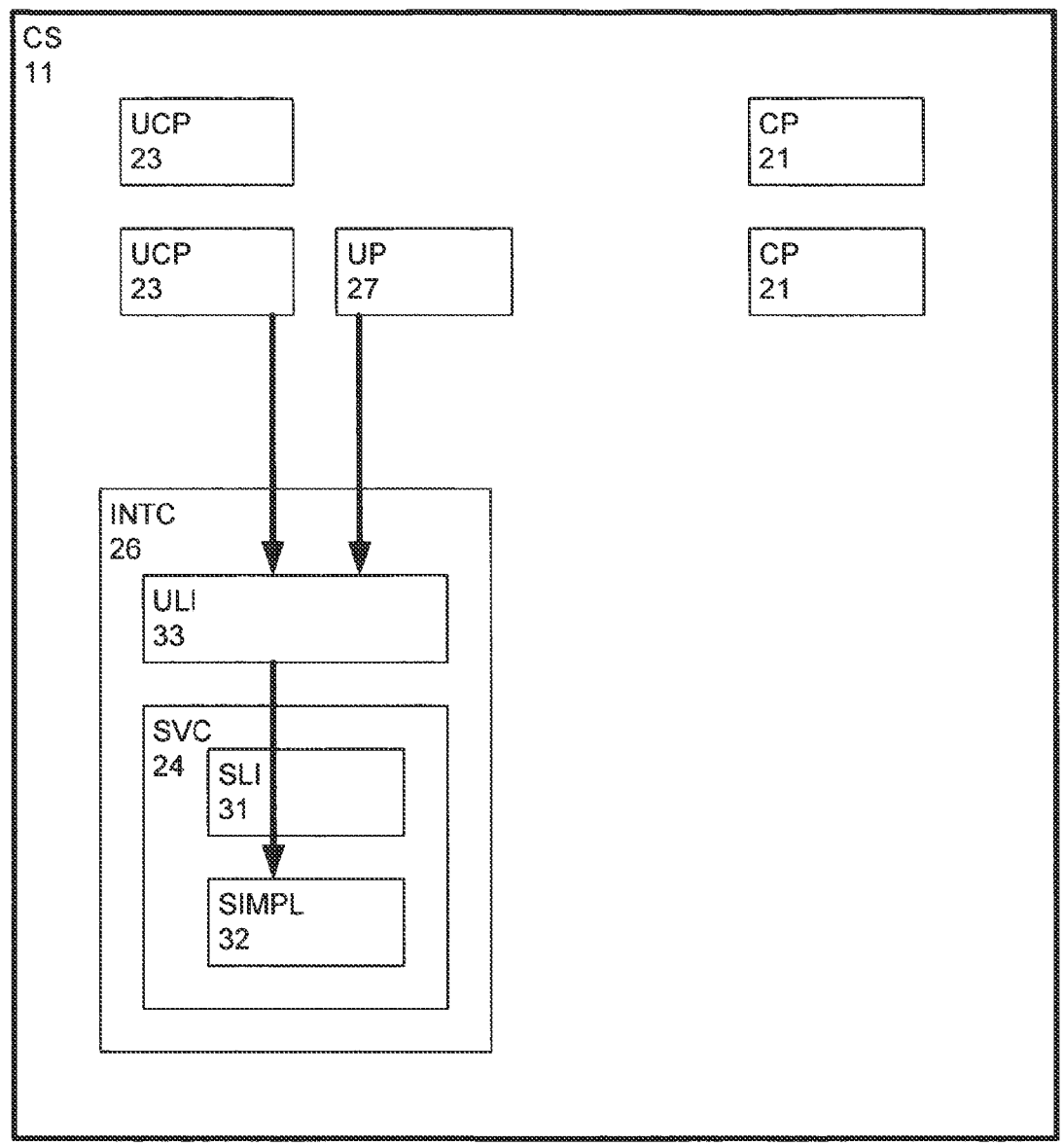
FIG. 5 is a block diagram illustrating the "run phase" of a system for the containment of usage of language interfaces, wherein one or more transformed clients use the service by interacting with the interceptor via the unique interface, according to an embodiment of the present invention.

FIG. 5 is a block diagram illustrating the "run phase" of a system for the containment of usage of language interfaces, wherein one or more transformed clients UCP 23 use the service SVC 24 by interacting with the interceptor INTC 26 via the unique interface ULI 33 (indicated by the arrow from UCP 23 to ULI 33), according to an embodiment of the present invention. As a result of the "build phase", the only way to use the service SVC 24 is via interaction with the interceptor INTC 26. Because the transformed clients UCP 23 use the correct language interface ULI 33, the interceptor INTC 26 can interpret the clients' UCP 23 request and re-translate a unique-language expression into a standard-language expression and pass it to SVC 24 (indicated by the arrow from ULI 33 to SVC 24). The same interception process occurs for other attempts to use SVC 24, including attempts from an original client program CP 21, or from any other program (denoted UP 27) which is not part of the fixed set of unique clients generated in the "build phase" and which therefore does not use the unique language interface ULI 33. Nevertheless, such attempts are redirected to ULI 33 (indicated by arrow from UP 27 to ULI 33), and the interceptor INTC 26 will be unable to interpret the input data originating from such program UP 27 since such input data is not expressed in the unique language of ULI 33.

Figure 6:
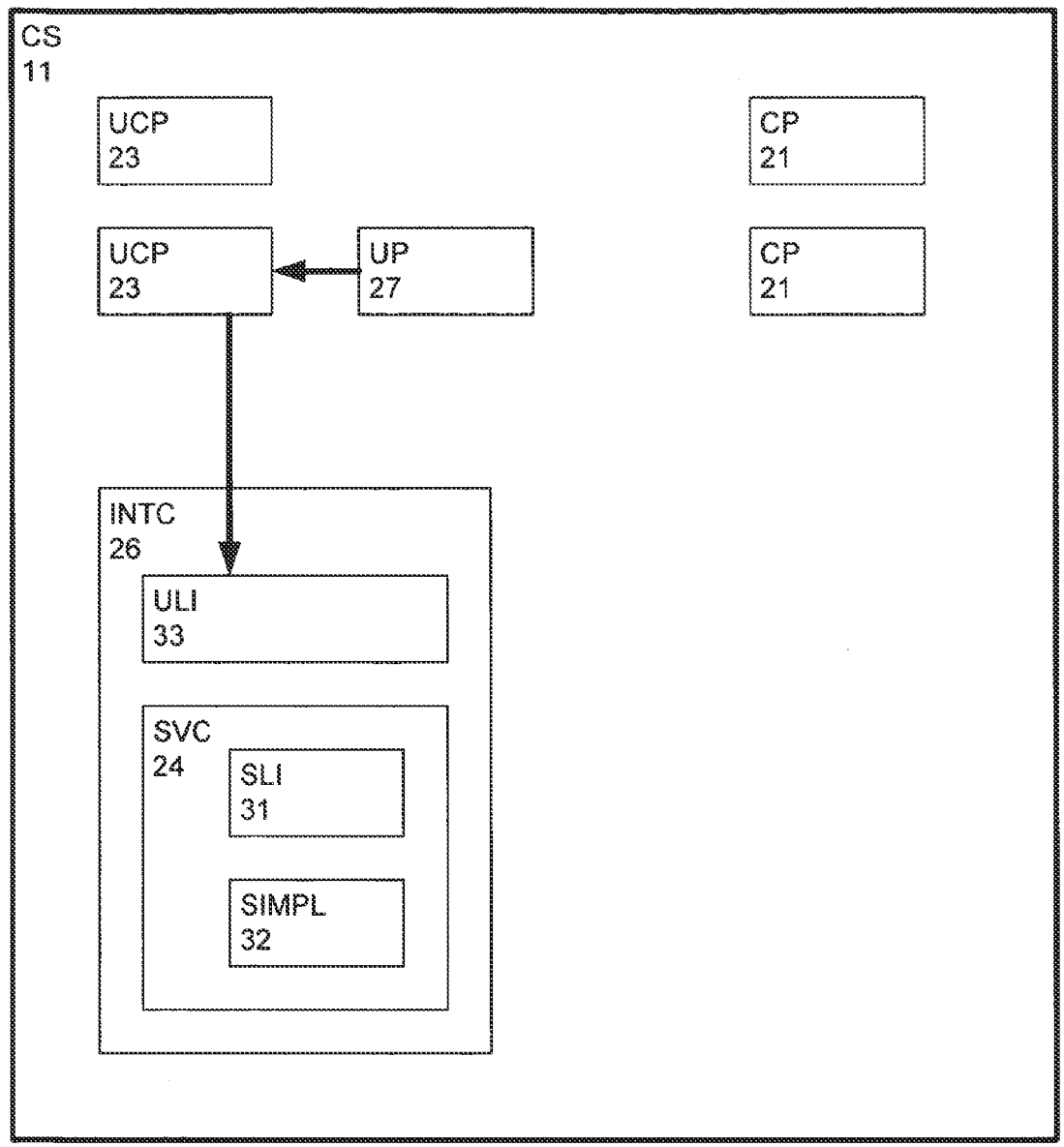
FIG. 6 is a block diagram illustrating a system for the containment of usage of language interfaces, wherein an unknown program supplies some data to a unique client program, the data indicating an expression in the standard language, according to an embodiment of the present invention.

FIG. 6 is a block diagram illustrating a system for the containment of usage of language interfaces (similar to the system shown in FIG. 5), wherein an unknown program UP 27 supplies to a unique client UCP 23 data indicating an expression in the standard language, according to an embodiment of the present invention. Even if the unique client UCP 23 inadvertently passes on such a standard-language expression in a service request to SVC 24, the interceptor INTC 26 will be unable to interpret the standard-language expression.

Figure 7A:
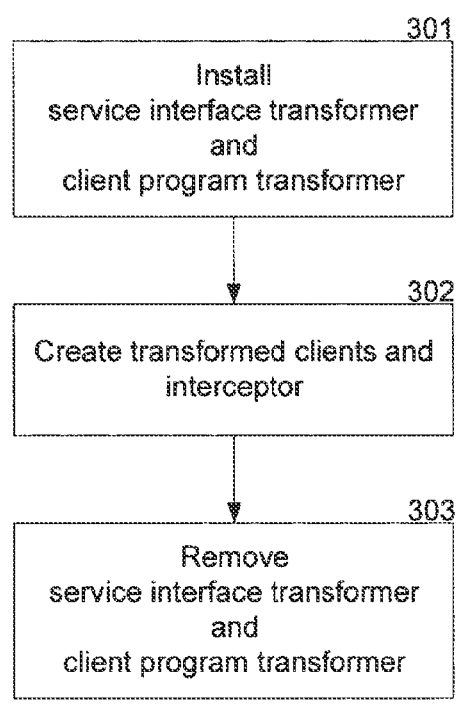
FIG. 7a is a flow diagram illustrating a method for the containment of usage of language interfaces, according to an embodiment of the present invention.

FIG. 7a is a flow diagram illustrating a method for the containment of usage of language interfaces, according to an embodiment of the present invention. FIG. 7a shows the steps for the correct execution of only selected client programs present on the system CS 11 in the "build phase", while rendering the system CS 11 incapable of providing service to any other (untransformed) clients (as described above in FIGS. 2 through 6):

Install 301 service interface transformer SIT 25 and client-program-transformer CPT 22.

Run 302 SIT 25 and CPT 22 to create transformed clients UCP 23 which use a unique variant of the standard language, and an interceptor INTC 26 that implements this language. (Details of the operation of the client program transformer CPT 22 are described below and shown in FIGS. 13 through 17).

Remove 303 the service interface transformer SIT 25 and client-program-transformer CPT 22.

When a program attempts to use the service SVC 24, the interceptor INTC 26 attempts to interpret the program's submission as an expression in the unique variant of the standard language. (Details of the operation of the interceptor INTC 26 are described below and shown in FIG. 20).

If successful, the interpretation of the unique variant results in an expression in the standard language, which is passed to the standard service SVC 24.

If unsuccessful, then one of several possible error handling options are used, including but not limited to the following:

Do not call on the standard service SVC 24.

Do call on the standard service SVC 24, with the re-translated portions of the unique-language request, including any un-translated expressions by converting them into constant data in the standard language.

Do call on the standard service SVC 24, with the re-translated portions of the unique-language request, excluding any un-translated expressions.

Figure 7B:
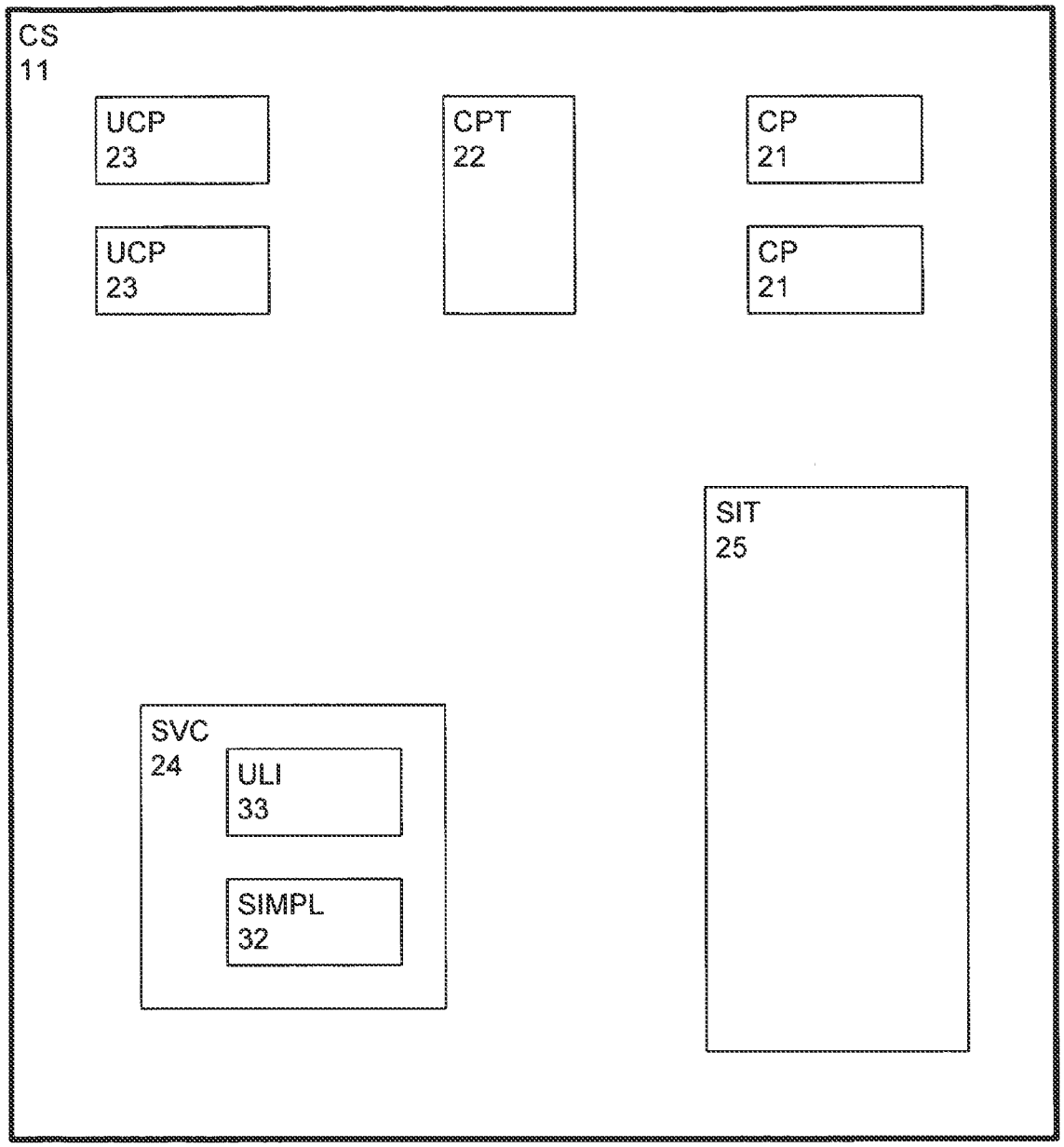
FIG. 7b is a block diagram illustrating an alternative embodiment of the present invention, wherein the service interface transformer transforms the service not by creating an interceptor for the service, but rather by modifying the service by replacing the standard language interface with a unique language interface.

FIG. 7b is a block diagram illustrating an alternative embodiment of the present invention, wherein the SIT 25 transforms the service SVC 24 not by creating an interceptor INTC 26 for the service (as described above and indicated in FIG. 1), but rather by modifying SVC 24 by replacing the standard interface SLI 31 with ULI 33. In this embodiment the "run phase" differs in that no re-translation occurs since there is no longer any service that uses the standard interface. Any request not formulated in the unique language will not be interpreted successfully.

In another alternative embodiment of the present invention, the service SVC 24 is not modified, but rather replaced with a new service that is functionally equivalent to the standard service, but which uses the unique language as its interface ULI 33. Again, any request that is not formulated in the unique language will not be interpreted successfully.

Figure 8:
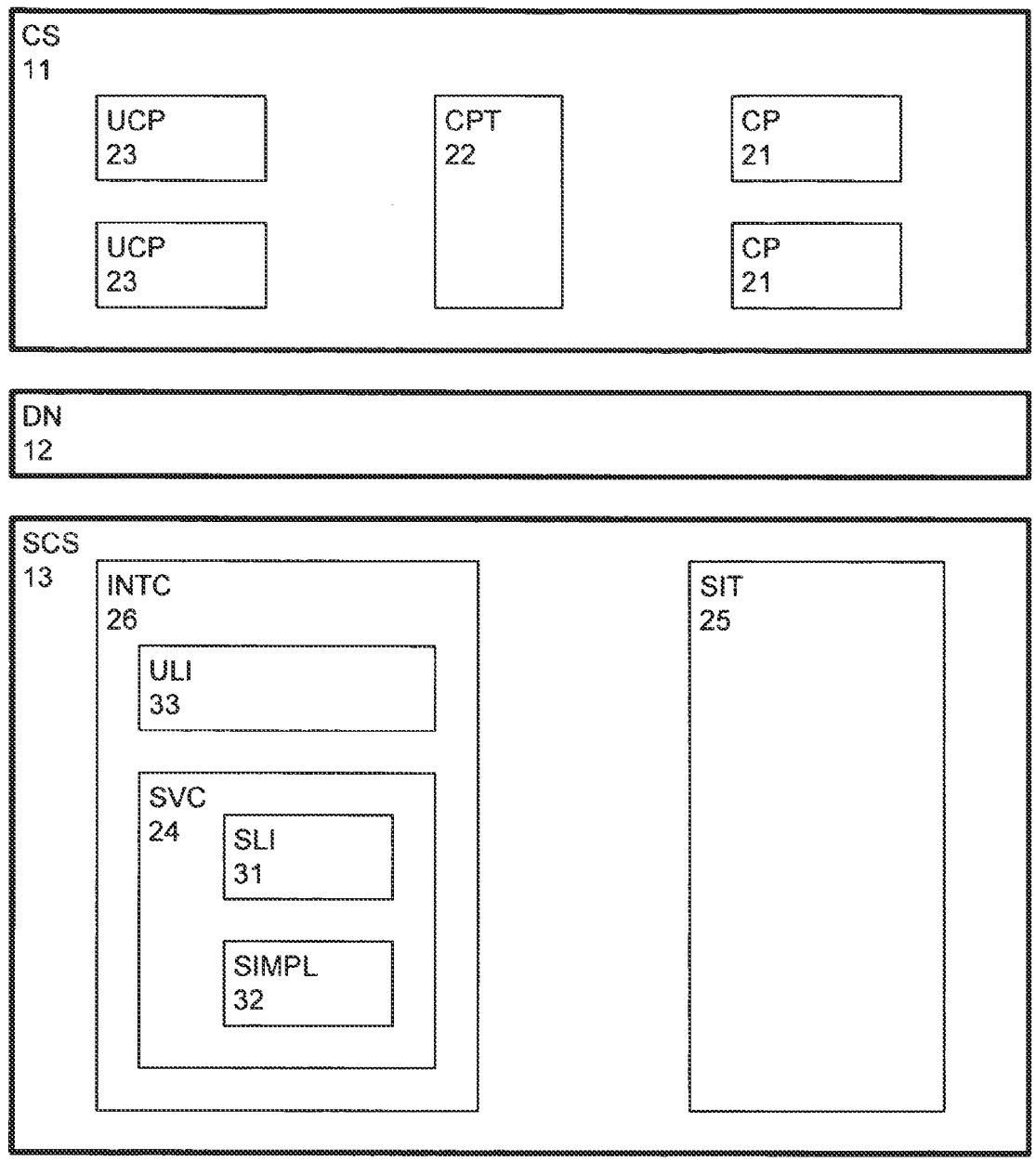
FIG. 8 is a block diagram illustrating an alternative embodiment of the present invention, wherein the one or more clients and the service are on different hosts and communicate via a data network, according to an embodiment of the present invention.

FIG. 8 is a block diagram illustrating an alternative embodiment of the present invention, wherein the one or more clients and the service are on different hosts and communicate via a data network denoted DN 12. The client software is on the host denoted CS 11 while the service SVC 24 is on the host denoted SCS 13. This embodiment comprises an interceptor INTC 26 in a manner analogous to the embodiment described in FIG. 1. The dataflows between the components are transmitted over the network DN 12, but are otherwise as described above for FIGS. 2 through 6.

Figure 9:
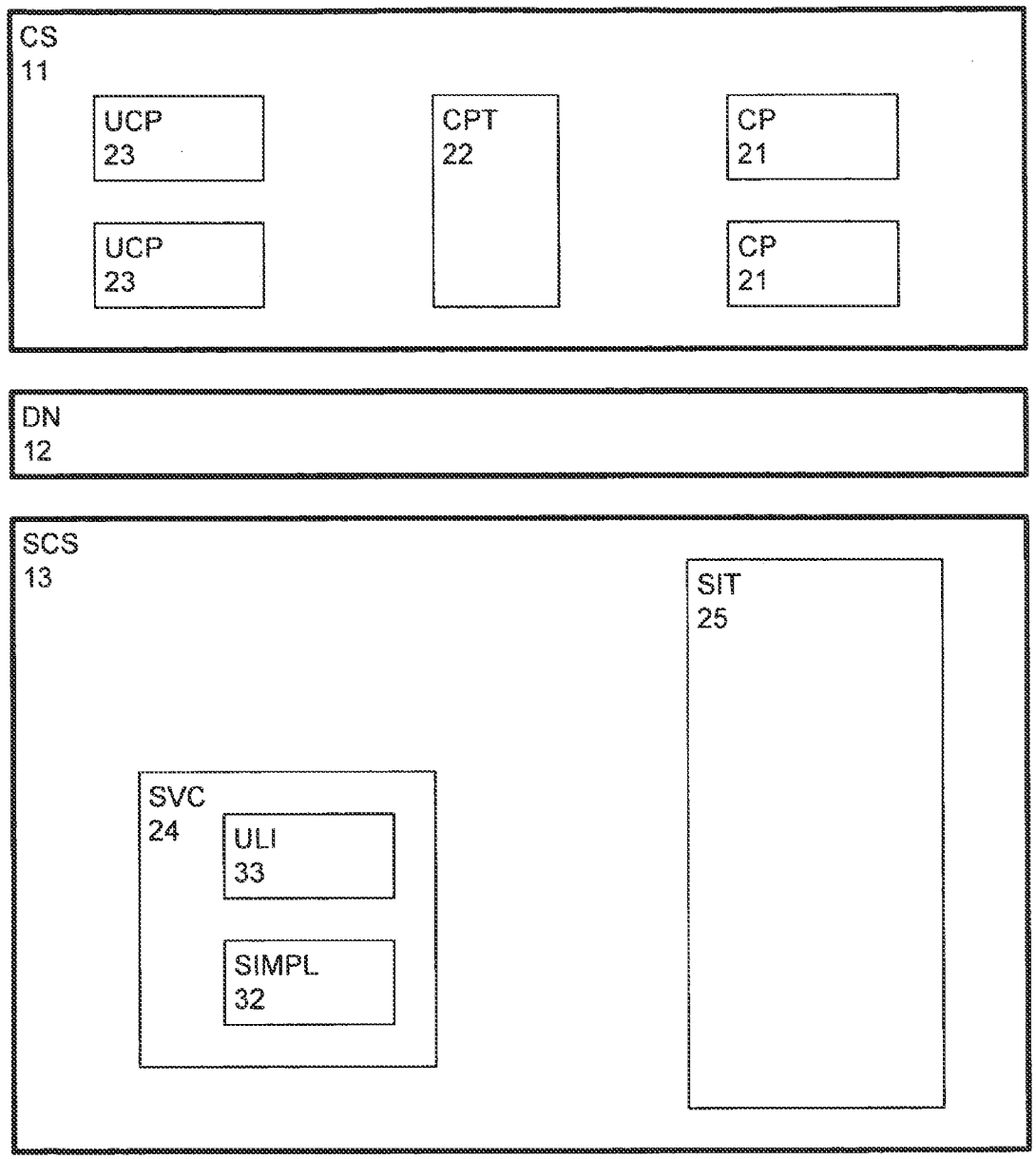
FIG. 9 is a block diagram illustrating a similar network-based alternative embodiment of the present invention, using service modification or replacement similar to that shown in FIG. 7b, according to an embodiment of the present invention.

FIG. 9 is a block diagram illustrating a similar network-based alternative embodiment of the present invention, using service modification or replacement similar to that shown in FIG. 7b. The dataflows between the components are transmitted over the network DN 12, but are otherwise as described above for FIG. 8.

Figure 10:
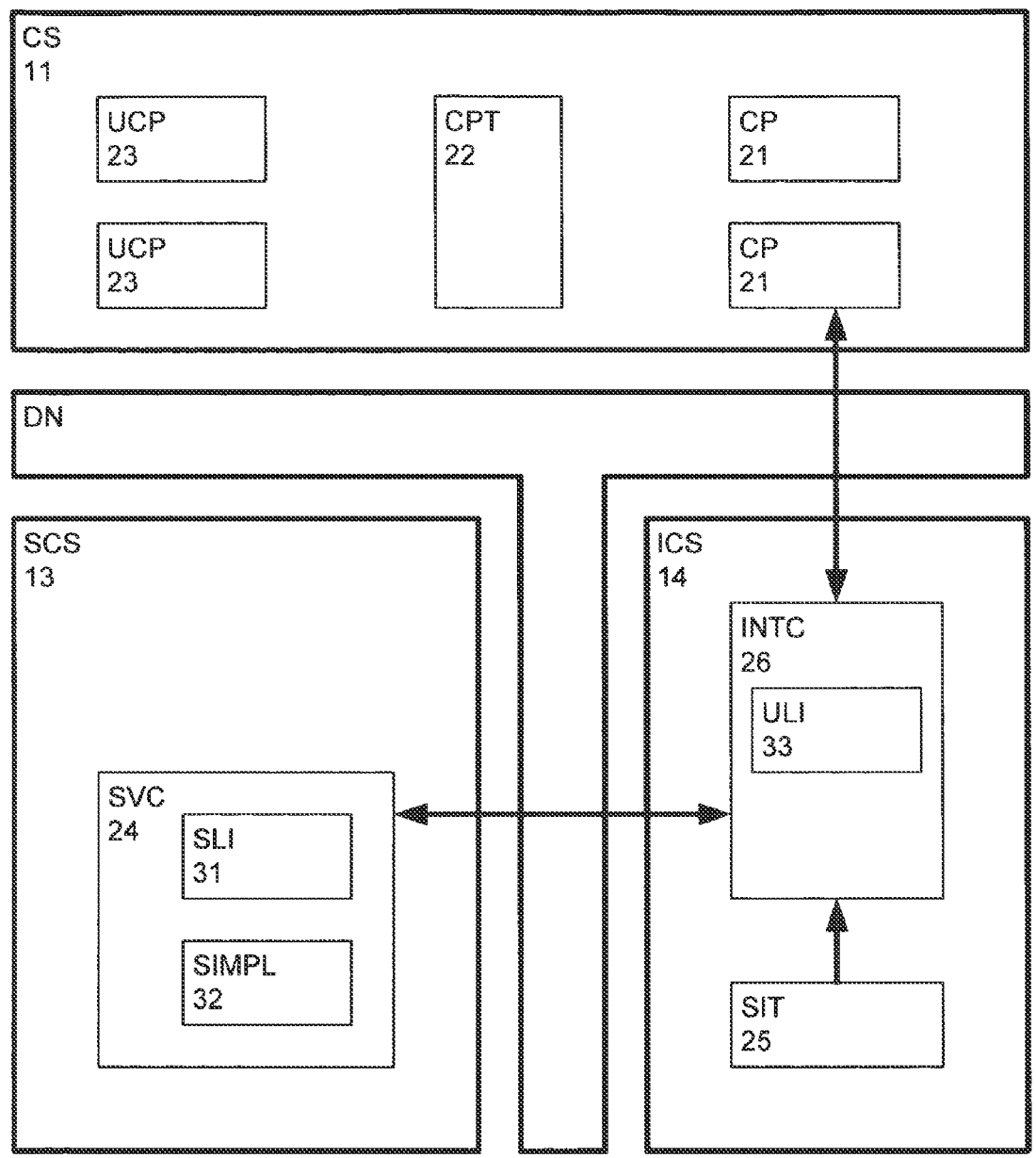
FIG. 10 is a block diagram illustrating an alternative embodiment of the present invention, wherein the interceptor resides on a third host.

FIG. 10 is a block diagram illustrating an alternative embodiment of the present invention, wherein the interceptor INTC 26 resides on a third host denoted ICS 14. The dataflows between the components are transmitted over the network DN 12, but are otherwise as described above for FIGS. 2 through 6. In the embodiment shown in FIG. 10, effective usage requires an ancillary mechanism for network-level access control, embodied in the network DN 12, that blocks direct communication from the host CS 11 to the host SCS 13 for the communication channels used by the service SVC 24.

Figure 11:
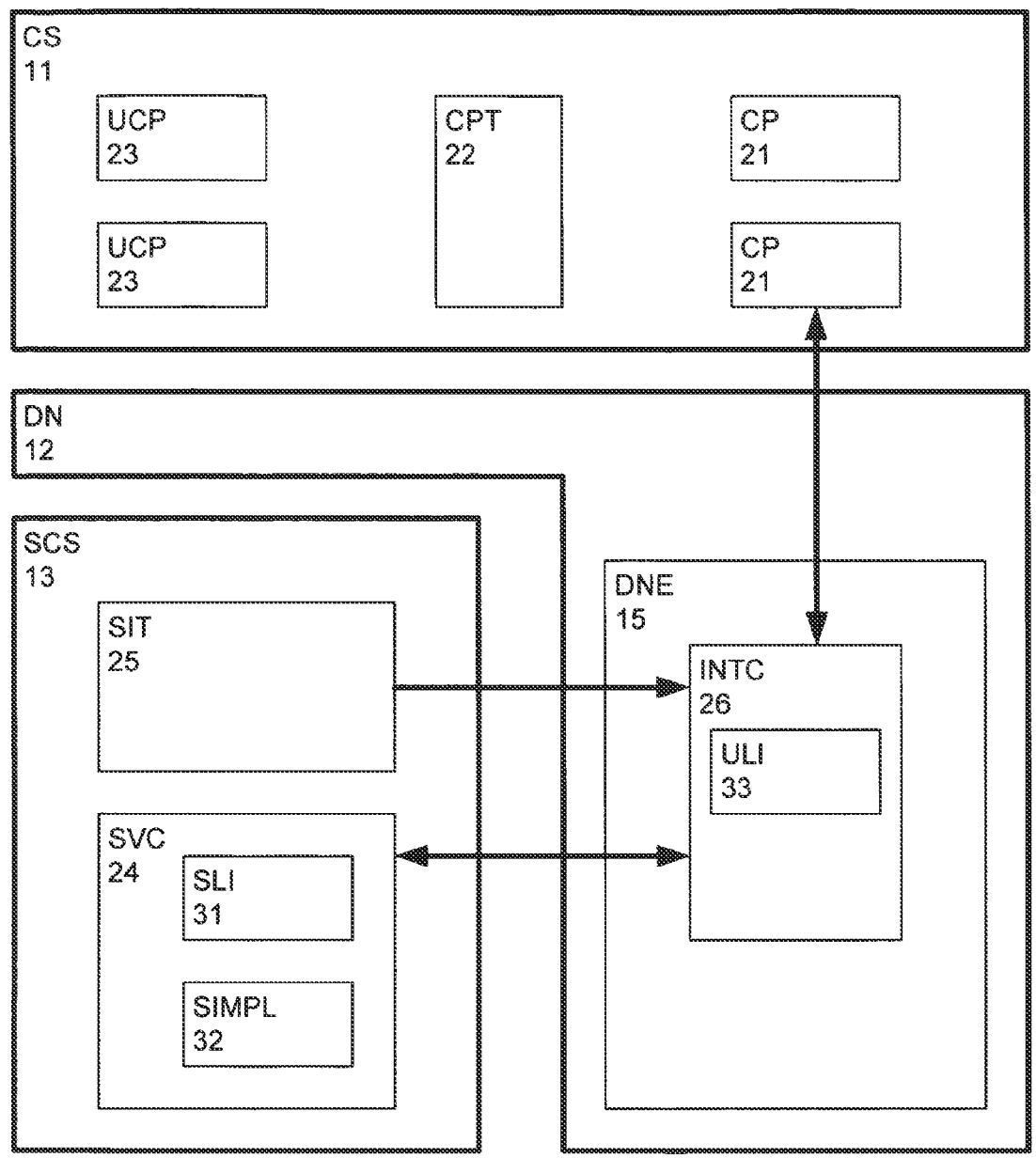
FIG. 11 is a block diagram illustrating an alternative embodiment of the present invention, wherein the interceptor resides on a component of the data network (such as a router or switch).

FIG. 11 is a block diagram illustrating an alternative embodiment of the present invention, wherein the interceptor INTC 26 is on a component of the data network DN 12 (such as a router or switch) denoted DNE 15. The "run phase" dataflows are similar to those shown in FIG. 10, except that the interceptor INTC 26 is on the data network element DNE 15 rather than on a server host. The "build phase" dataflow differs in that the service interface transformer SIT 25 runs on host SCS 13 as in FIG. 8, but installs the interceptor INTC 26 on the data network element DNE 15 (indicated by the arrow from SIT 25 to INTC 26). In one embodiment, the interceptor INTC 26 is able to intercept because the data network element DNE 15 is in the physical communication path between the hosts CS 11 and SCS 13. In an alternative embodiment, the interception depends on network level routing and/or access controls for enforcing that communication between hosts CS 11 and SCS 13 passes through the data network element DNE 15.

It is an advantageous aspect of the present invention that the transformers SIT 25 and CPT 22 may run on any host and use the network to push the generated software (UCP 23, INTC 26 and ULI 33), comprising portable code, to one or more hosts on which the generated software will run. Furthermore, the build-hosts need not necessarily be network-connected, since the generated software can be moved to the run-hosts using movable storage such as CD-ROMS, diskettes, or any other storage media. Additionally, in this case, the build-hosts need not actually run the generated software. This allows the present invention to be deployed in a distributed computing environment, such as a client-server environment, a client-proxy-server environment, a client-DNE-server environment, and/or other distributed computing environment.

Figure 12A:
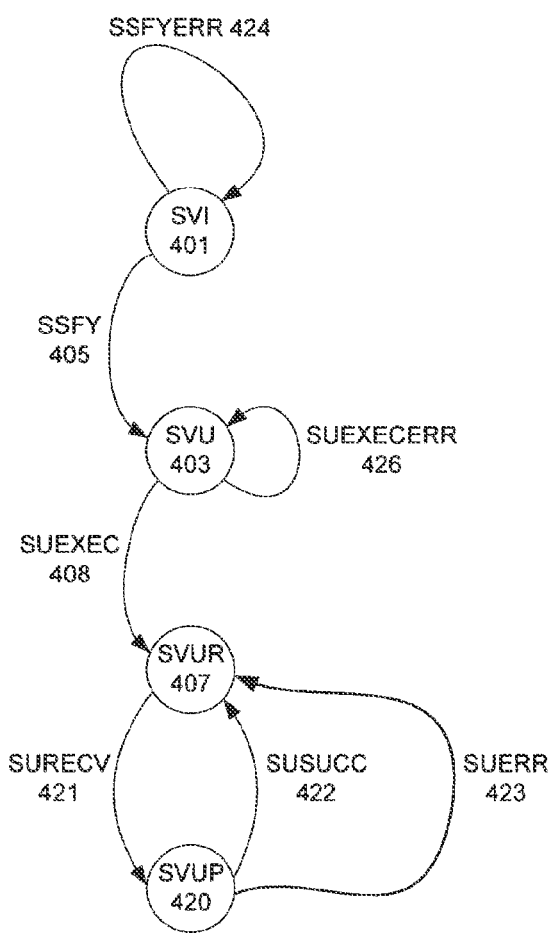
FIGS. 12a and 12b are state machine diagrams illustrating one embodiment of the present invention, according to an embodiment of the present invention.
Figure 12B:
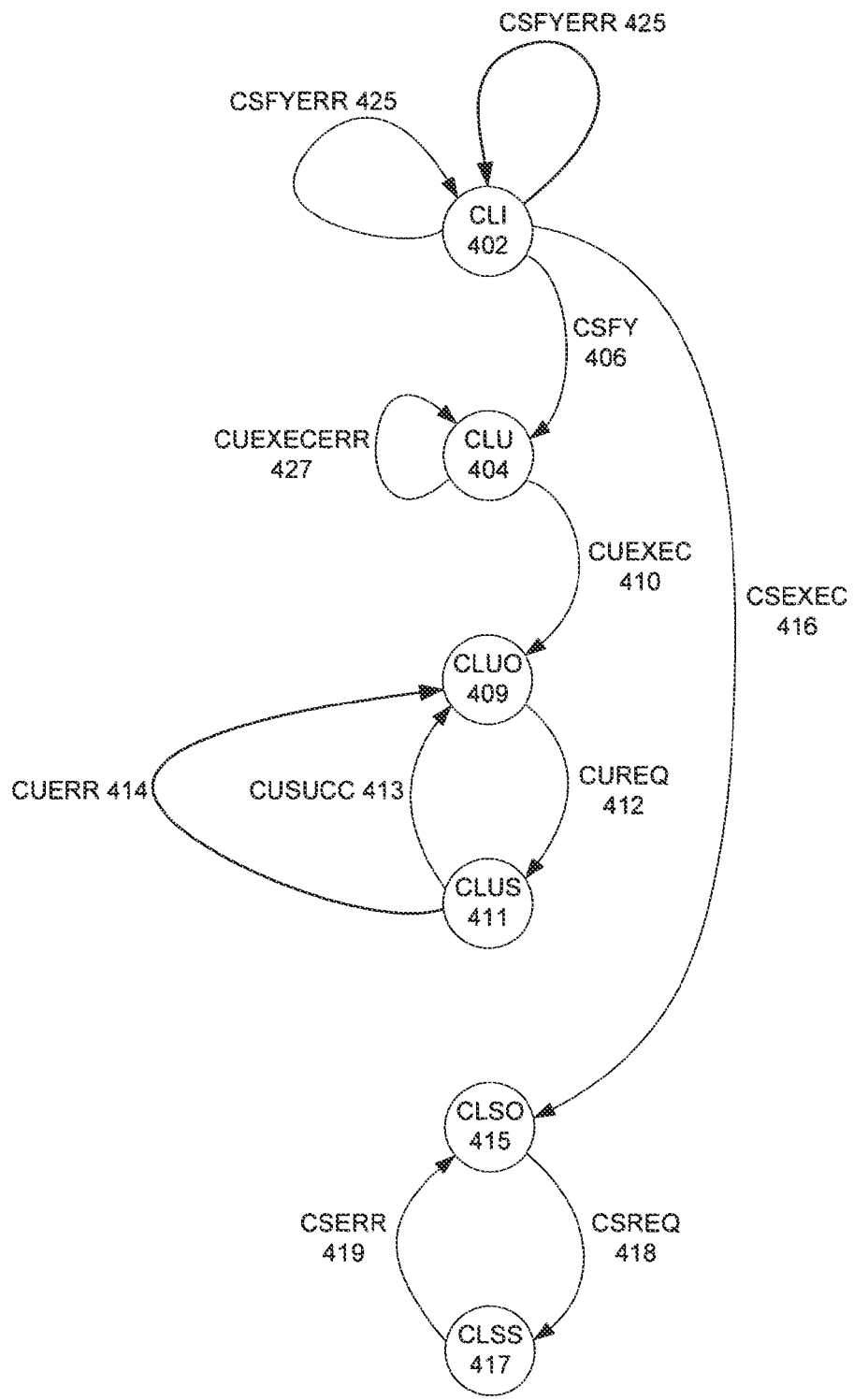

FIGS. 12a and 12b are state machine diagrams illustrating one embodiment of the present invention as operating on a single computing system, according to an embodiment of the present invention. FIG. 12a shows a state machine for a service and FIG. 12b shows a state machine for a client. A client can cause a state change in a service by sending a request to the service. A service can cause a state change in a client by replying to a client request. Other state changes are the result of the operation of components of the present invention.

The following list describes the states and state transitions shown in FIGS. 12a and 12b:

State: service initial state (SVI 401)—The system components that implement a service are installed on the system upon which the present invention will be used, and are capable of operating in a normal manner to implement a standard or common linguistic interface. For a given linguistic interface, there may be multiple components, including separate independent instances of services using the same linguistic interface. For a given system, there may be multiple distinct linguistic interfaces that can be contained.

State: client initial state (CLI 402)—for each instance of each service using a linguistic interface, the initial state of the client software is that it is installed on the system upon which the present invention will be used, and is capable of operating in a normal manner to use a standard or common linguistic interface.

State: service unique state (SVU 403)—service implements only a specific unique variant of the standard interface, for example, by means of encapsulation by an interceptor, or by means of direct modification or replacement of service implementation.

State: client unique state (CLU 404)—client uses only a specific unique variant of the standard interface.

State transition: service solidification (SSFY 405)—starting state is service initial state; ending state is service unique state.

State transition: client solidification (CSFY 406)—starting state is client initial state; ending state is client unique state.

State: service unique receiving state (SVUR 407)—service implements only a specific unique variant of the standard interface, and is operational.

State transition: service unique execution (SUEXEC 408)—starting state is service unique state; ending state is service unique receiving state.

State: client unique operating state (CLUO 409)—client uses only a specific unique variant of the standard interface, and is operational.

State transition: client unique execution (CUEXEC 410)—starting state is client unique state; ending state is client unique operating state.

State: client unique sending state (CLUS 411)—client has made a service request using the unique interface.

State transition: client unique request (CUREQ 412)—starting state is client unique operating; ending state is client unique sending.

State transition: unique request success (CUSUCC 413)—starting state is client unique sending; ending state is client unique operating; the client's request was successfully executed by the service, and appropriate return data supplied to client.

State transition: unique request error (CUERR 414)—starting state is client unique sending; ending state is client unique operating; the client's request was not successfully executed by the service, and appropriate error return data supplied to client.

State: client standard operating state (CLSO 415)—client uses standard interface, and is operational.

State transition: client standard execution (CSEXEC 416)—starting state is client initial state; ending state is client standard operating state.

State: client standard sending state (CLSS 417)—client has made a service request using the standard interface.

State transition: client standard request (CSREQ 418)—starting state is client standard operating; ending state is client standard sending.

State transition: standard request error (CSERR 419)—starting state is client standard sending; ending state is client standard operating; the client's request was not successfully executed by the service, and error return data supplied to client may indicate the service's inability to process the request because it did not conform to the service's linguistic interface.

State: service unique processing state (SVUP 420)—service implements only a specific unique variant of the standard interface, and is processing a request.

State transition: service unique reception (SURECV 421)—starting state is service unique receiving state; ending state is service unique processing state.

State transition: service unique request success (SUSUCC 422)—starting state is service unique processing state; ending state is service unique receiving state; the client's request was successfully executed by the service, and appropriate return data is supplied to client.

State transition: service unique request error (SUERR 423)—starting state is service unique processing state; ending state is service unique receiving state; the client's request was not successfully executed by the service, and appropriate error return data is supplied to client.

State transition: unsuccessful service solidification (SSFYERR 424)—starting state and ending state are both service initial state; the attempt to solidify the service components encountered an execution error.

State transition: unsuccessful client solidification (CSFYERR 425)—starting state and ending state are both client initial state; the attempt to solidify a service's client encountered an execution error.

State transition: unsuccessful unique service execution (SUEXECERR 426)—starting state is service unique state; ending state is service unique state; failure in attempt to execute service implementation.

State transition: unsuccessful unique client execution (CUEXECERR 427)—starting state is client unique state; ending state is client unique state; failure in attempt to execute client.

State transition: unsuccessful standard client execution (CSEXECERR 428)—starting state is client initial state; ending state is client initial state; failure in attempt to execute standard client.

The components described in FIGS. 1 through 11 operate according to the state machines illustrated in FIGS. 12*a* and 12*b*. Client software CP 21 starts out in the initial state CLI 402, installed and capable of using the standard linguistic interface of a service SVC 24. The operation of the client program transformer CPT 22 on client software CP 21 constitutes either (a) the state transition CSFY 406 from state CLI 402 to state CLU 404, or (b) the state transition CSFYERR 425 from state CLI 402 to state CLI 402, in cases where the transformer CPT 22 is unable to complete its operation to create a unique client program UCP 23 that is functionally equivalent to the original client software but which uses a unique interface ULI 33.

A service implementation SVC 24 starts out in the initial state SVI 401, installed and offering the service via its standard linguistic interface SLI 31. The operation of the service interface transformer SIT 25 on a service implementation SVC 24 constitutes either (a) the state transition SSFY 405 from state SVI 401 to state SVU 403, or (b) the state transition SSFYERR 424 from state SVI 401 to state SVI 401, in cases where the service interface transformer SIT 25 is unable to complete its operation to create an interceptor for SVC 24 or to directly modify or replace SVC 24 so that it provides a functionally equivalent service via a unique interface ULI 33.

If the client program transformer CPT 22 is successful in converting designated client software CP 21 that uses a given service SVC 24, and if the service interface transformer SIT 25 is successful in transforming the service SVC 24, then the "build phase" is complete and the service has been contained.

"Designated client software" in this context refers to one or more software packages that are selected (typically but not necessarily by a human operator) to be converted and hence enabled to successfully use the contained service. For example, the designated client software would be all client software of a given service that are installed on a given computing system.

Following this "build phase", the converted service and clients can be executed using the capabilities of the computing system that they are installed on. Execution of the service SVC 24 constitutes either (a) the state transition SUEXEC 408 from state SVU 403 to state SVUR 407, or (b) the state transition SUEXECERR 426 from state SVU 403 to state SVU 403, in cases where the computing system is unable to successfully start execution of the service SVC 24. After state transition SUEXEC 408, the service SVC 24 is ready to receive service requests via the unique interface ULI 33.

Similarly, execution of the unique client program UCP 23 constitutes either (a) the state transition CUEXEC 410 from state CLU 404 to state CLUO 409, or (b) the state transition CUEXECERR 427 from state CLU 404 to state CLU 404, in cases where the computing system is unable to successfully start execution of the client UCP 23. After state transition CUEXEC 410, the transformed client UCP 23 is operating and may (depending on its input and course of execution) make one or more requests of the service SVC 24 via the unique interface ULI 33.

Following the "build phase" it is still possible for standard (i.e. untransformed) client software to run and attempt to use a contained service. Such standard client software comprises one or more clients CP 21 that remain installed after the "build phase", or unknown programs (such as UP 27 shown in FIG. 5) that may have been introduced into the computing system CS 11 after the "build phase". Execution of these programs constitutes either (a) the state transition CSEXEC 416 from state CLI 402 to state CLSO 415, or (b) the state transition CSEXECERR 428 from state CLI 402 to state CLI 402, in cases where the computing system is unable to successfully start execution of the client. After state transition CSEXEC 416, the client is in the standard (i.e. not unique) operating state CLSO 415 and may (depending on its input and course of execution) make one or more requests of the service SVC 24 via the standard interface SLI 31. Because the service can be used only via the unique interface ULI 33, such attempts fail, with such attempts and failure shown as a state transition CSREQ 418 from state CLSO 415 to state CLSS 417, which is constituted by the client software making a standard request of the service SVC 24 and waiting for the result. This eventually results in a further state transition CSERR 419 from state CLSS 417 to state CLSO 415, which is a result of the service SVC 24 returning an error due to the client failing to make a comprehensible service request via the unique interface ULI 33, the ULI 33 representing the only way that service SVC 24 may respond to a service request.

Successful use of the service by a client UCP 23 is shown in FIG. 12*b* as a state transition CUREQ 412 from state CLUO 409 to state CLUS 411, which is constituted by the unique client software UCP 23 making a request of the service SVC 24 and waiting for a result. There are two possible further state transitions. In the first case, the client's UCP 23 request is successfully executed and the service returns appropriate output data to the client UCP 23, with the service's return causing a state transition CUSUCC 413 from state CLUS 411 back to state CLUO 409. In the second case, the service is unable to complete the client's UCP 23 request and returns appropriate error return data to the client UCP 23, with the service's return causing state transition CUERR 414 from state CLUS 411 back to state CLUO 409.

A similar success or error pair of state transitions applies to the service implementation SVC 24. When the service is in state SVUR 407 waiting for a request, a client request triggers the state transition SURECV 421 from state SVUR 407 to state SVUP 420, the state in which the service attempts to process the request. At this point, two further state transitions are possible, both from state SVUP 420 back to state SVUR 407. Transition SUSUCC 422 represents the case where the client request was successfully completed. Transition SUERR 423 represents the case where the client request was not successfully completed, for example because the client request was incomprehensible (i.e. not expressed according to the unique variant ULI 33 of the standard linguistic interface of the service SVC 24), or due to an execution error encountered while processing the client request despite the client request being linguistically correct.

The client program transformer CPT 22 operates by examining an input program (a client program CP 21) and producing an output program (a unique client program UCP 23). Three properties characterize the input and output programs:

The output program UCP 23 differs from the input program CP 21 in terms of the data used by the program to formulate expressions in the language of the interface of the service used.

In the input program CP 21, expression formulation includes the use of constant data, for example a string representing a keyword of the standard language.

In the output program UCP 23, expression formulation is based on processing data to emit the unique variant language according to ULI 33 instead of according to the standard language interface SLI 31.

Figure 13:
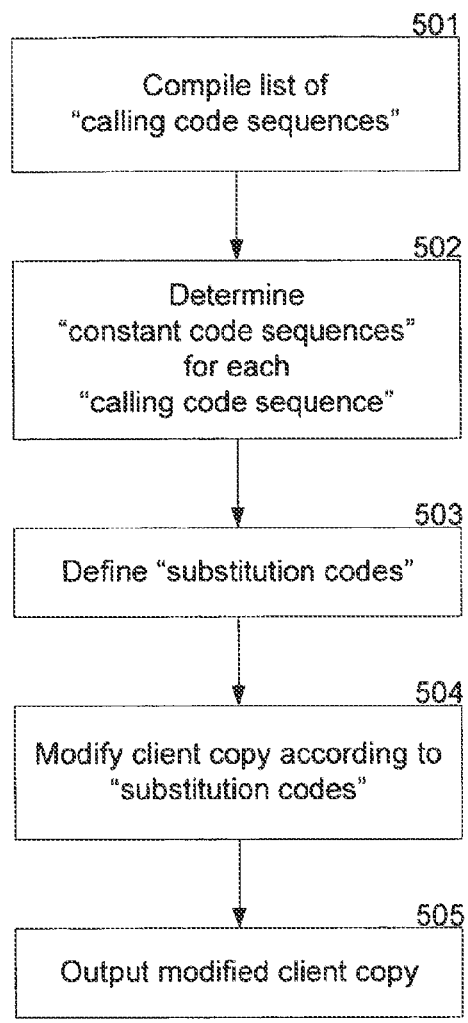
FIG. 13 is a flow diagram illustrating the operation of the client program transformer, according to an embodiment of the present invention.

FIG. 13 is a flow diagram illustrating the operation of the client program transformer CPT 22, according to an embodiment of the present invention, wherein a "calling code sequence" is defined as a code sequence that submits one or more service parameter data to a service for interpretation, for example, a call of a function that passes its input data to the service that implements the standard language SLI 31, and wherein a "constant code sequence" is a code sequence in which constant data is used to compute service parameter data that is subsequently used as a standard language SLI 31 expression in a "calling code sequence." The following describes the operation of the client program transformer CPT 22:

Scan the input program CP 21 and compile 501 a list of all the "calling code sequences" for calls to the service that implements the standard language SLI 31.

For each "calling code sequence" in the "calling code sequence" list, scan the input program to compile 502 a list of all the "constant code sequences" that use constant data to compute service parameter data that is used in that "calling code sequence" (an example "constant code sequence" is an expression comprising a constant value, the result of the expression used in a variable assignment, the variable in turn used in a function call, the function call for passing data to a service implementation).

For each "constant code sequence" in the "constant code sequence" list, and for each constant value used in that "constant code sequence," define 503 a "substitution code" comprising a call to a subroutine, the subroutine implementing the function UVOC (described below), with the constant data value as an argument to the subroutine call.

Create a copy of the input program, and modify 504 it as follows:

For each "constant code sequence" in the "constant code sequence" list, and for each constant value used in that "constant code sequence," replace the constant value with the corresponding "substitution code" previously defined.

After all such substitutions have been applied, output 505 the resulting modified input program.

As a result of the steps shown in FIG. 13, the output program is the same as the input program, except that selected uses of a constant value have been replaced by a call to the function UVOC on the same constant value. In addition, the output program also contains the implementation of the function UVOC, together with supporting code and data used by the function UVOC.

An important "degenerate case" of an input program is a program that entirely consists of one expression in the language of the interface of the service. The execution of this program comprises passing the program data to the interpreter implementing the service. The unique variant of this client program comprises passing to the interpreter the result of the function UVOC when provided with the input program in its entirety.

In the embodiment of the client transformer CPT 22 described above and shown in FIG. 13, the substitution (i.e. replacing selected uses of constant values with calls to UVOC using the replaced constant value) is performed during the "build phase" so that the unique client software is executed during the "run phase" using the normal services of the base computing system.

Figure 14:
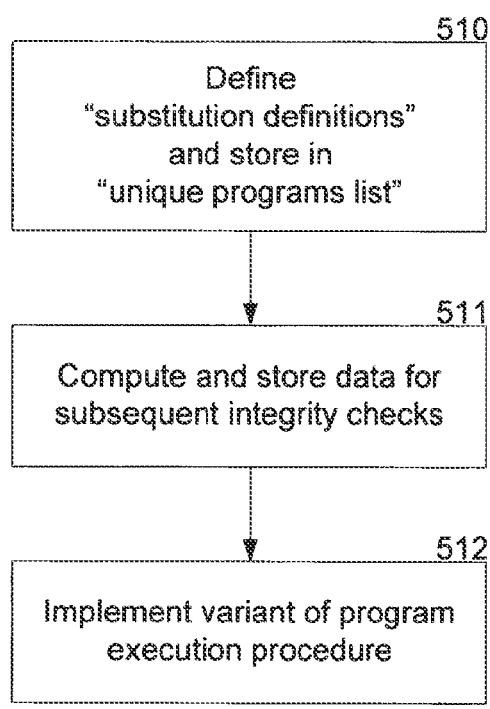
FIG. 14 is a flow diagram illustrating the operation of the client program transformer, according to an alternative embodiment of the present invention.

FIG. 14 is a flow diagram illustrating the operation of the client program transformer CPT 22, according to an alternative embodiment of the present invention. The terms "substitution" and "substitution definition" are defined as in the description of FIG. 13. In this embodiment, the "build phase" client-generation activities of the client program transformer CPT 22 are limited to the steps illustrated in FIG. 14 and described as follows:

Define 510 the substitutions for each client program as described above and shown in FIG. 13, storing each program's substitution definitions in a "unique programs list" for later use during the "run phase."

From the "unique programs list" data, compute 511 and store data (such as a checksum) that can be used later for integrity checks to detect modification of (a) the "unique programs list" data and/or (b) a program's substitution definition and/or (c) a program referenced in the "unique programs list".

Modify the base computing system to implement 512 a variant of the usual procedure for initiating execution of a program, which variant procedure is described below and shown in FIG. 15.

During the "run phase," the unique client UCP 23 is constructed as part of this variant procedure for initiating execution of a standard client CP 21. This variant procedure comprises the steps shown in FIG. 15 and is described as follows, wherein the terms "substitutions" and "substitution definition" are used in the same sense as in the above description of FIG. 13:

Determine 520 whether the program to be executed is in the "unique programs list" for which there are stored substitutions.

If not 521, then execute 522 the program normally.

Otherwise 523, check 524 the integrity of the "unique programs list" data.

If 525 modification of (a) the "unique programs list" data or (b) the program's substitution definition or (c) the program itself (as referenced in the "unique programs list") is 526 detected, then do not execute 527 the program.

Otherwise 528, obtain the stored substitutions for the program from the "unique programs list" and construct 529 a unique client UCP 23 by performing the stored substitutions on the program in the manner described in FIG. 13.

Instead of executing the original program, execute 530 the unique client UCP 23.

Figure 15:
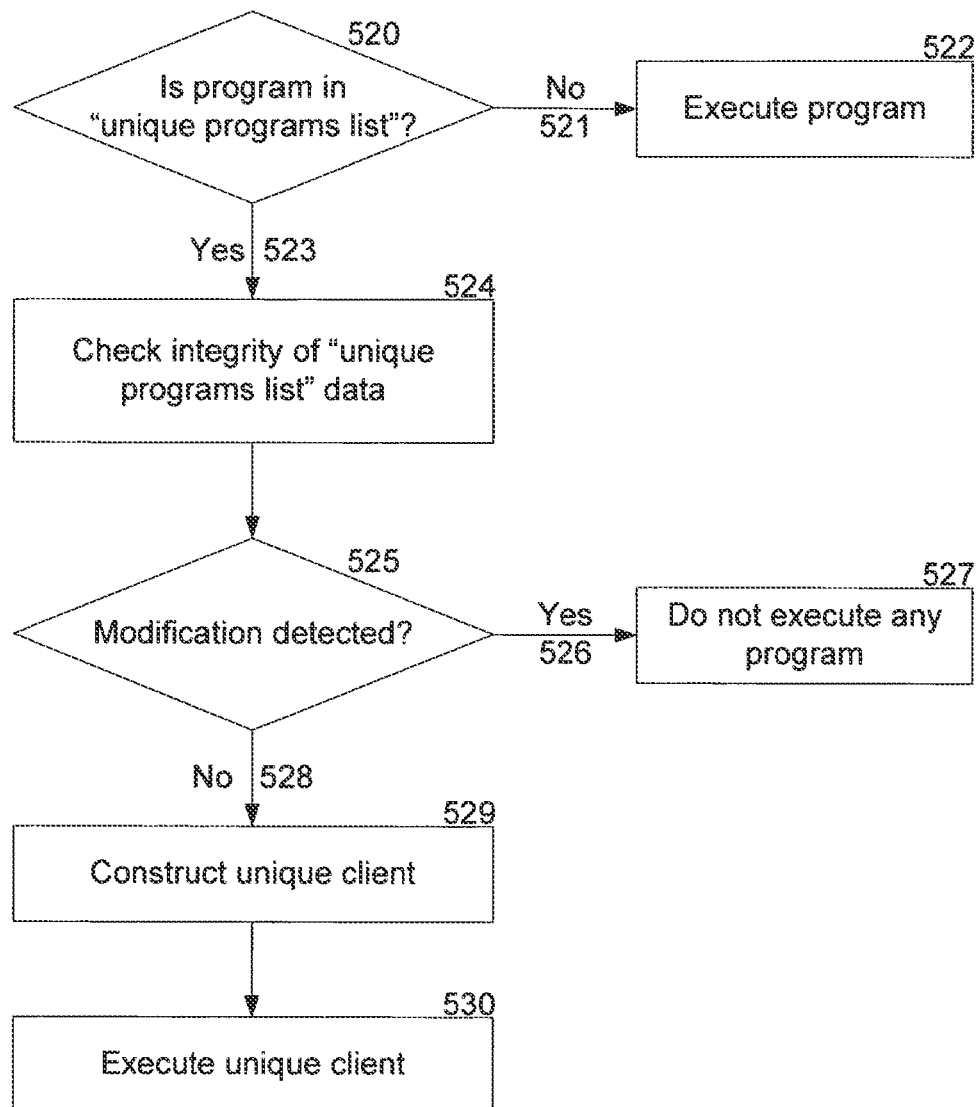
FIG. 15 is a flow diagram illustrating the operation of a variant procedure for initiating execution of a program, according to an embodiment of the present invention.

Another embodiment is a variation on the embodiment shown in FIG. 15, wherein the "stored substitutions" for a given program comprise solely a substitution of the code of the unique client UCP 23 for the code of the client program CP 21. In other words, the unique client UCP 23 is generated during the "build phase" and stored for later use in the "run phase" during which, when there is a request to execute the standard client CP 21, the corresponding pre-defined unique client UCP 23 is executed instead.

Figure 16:
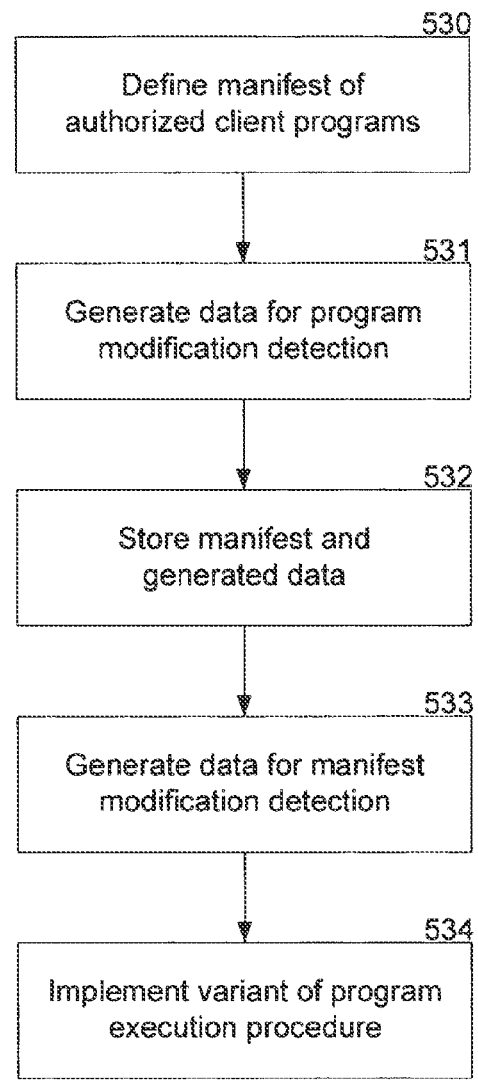
FIG. 16 is a flow diagram illustrating the operation of the client program transformer, according to an alternative embodiment of the present invention.

FIG. 16 is a flow diagram illustrating the operation of the client program transformer CPT 22, according to an alternative embodiment of the present invention. In this embodiment, the "build phase" client-generation activities of the client program transformer CPT 22 are limited to the steps illustrated in FIG. 16 and described as follows:

Define 530 a manifest of client programs CP 21 that are authorized to use the service.

For each such program, create 531 data (such as a checksum) that can be used later for integrity checks to detect modification of the program, and add that data to the manifest.

Store 532 this manifest for later use.

From the manifest data, create 533 and store data (such as a checksum) that can be used later for integrity checks to detect modification of the manifest data.

Modify the base computing system to implement 534 a variant of the procedure for initiating execution of a program, which variant procedure is defined below and shown in FIG. 17.

During the "run phase," the unique client UCP 23 is constructed as part of this variant procedure of initiating execution of a standard client CP 21. FIG. 17 is a flow chart illustrating the steps of this variant procedure, according to an embodiment of the present invention. The terms "substitution" and "substitution definition" are used in the same sense as in the above description of FIG. 13.

Check 540 the integrity of the manifest. If modification is 541 detected, then do not execute 542 any program.

Otherwise 543, check 544 the manifest to see if it includes the program to be executed.

If manifest does not include 545 the program to be executed, then execute 546 the program normally.

Otherwise 547, check 548 the integrity of the program. If modification is 549 detected, then do not 550 execute any program.

Otherwise 551, construct 552 the unique client UCP 23 by executing the client transformer CPT 22 in the manner described in Table 13.

Instead of executing the original program, execute 553 the constructed unique client UCP 23.

Figure 17:
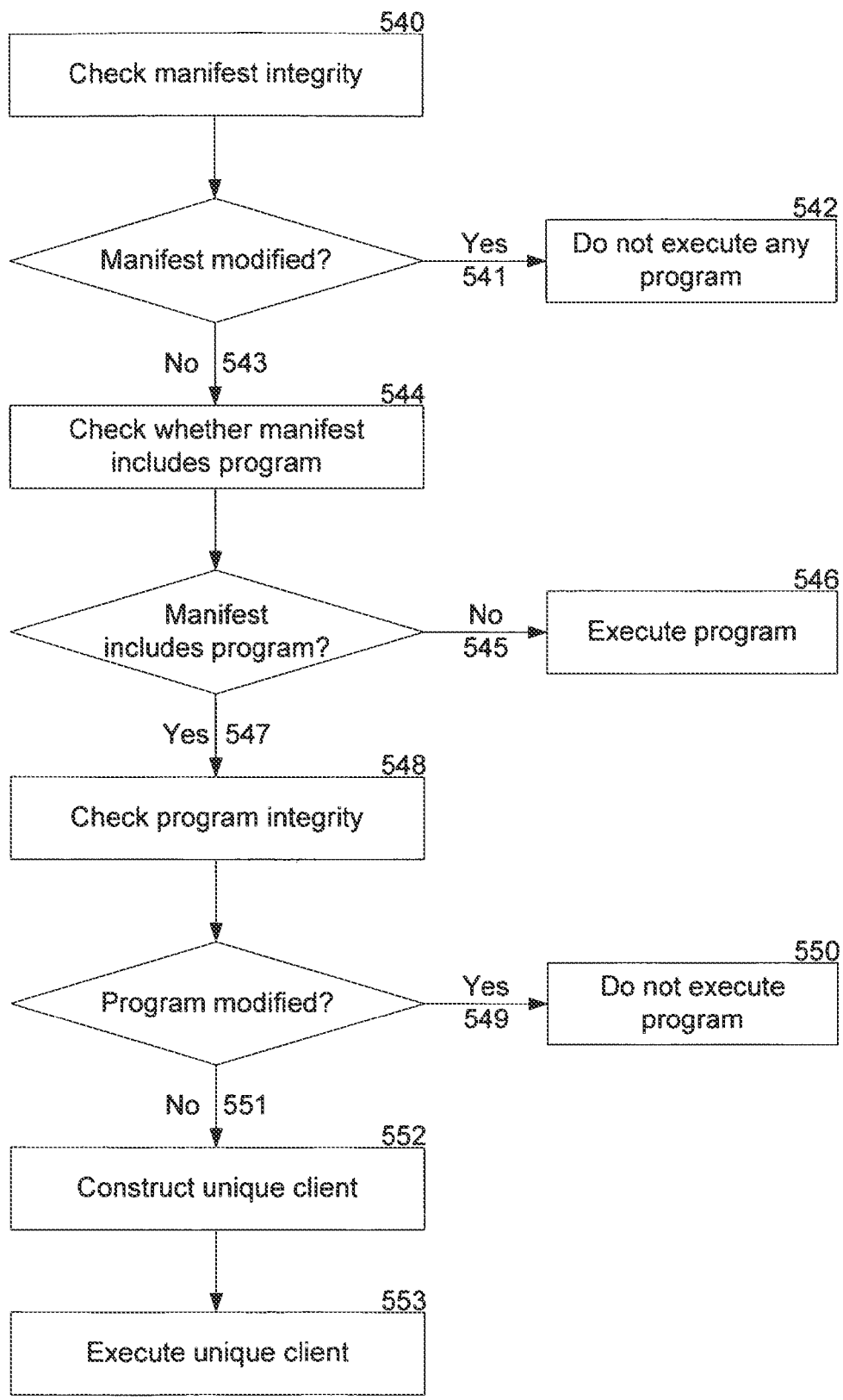
FIG. 17 is a flow diagram illustrating the operation of a variant procedure for initiating execution of a program, according to an embodiment of the present invention.

It is an advantageous aspect of the present invention that any of the three embodiments of the present invention described above in FIG. 13, in FIGS. 14 and 15, and in FIGS. 16 and 17, and/or other embodiments of the client program transformer CPT 22, can be combined with any of several possible embodiments of the service interface transformer SIT 25 and/or with any of several possible embodiments of the function UVOC.

In another variation on the above embodiments of the client program transformer CPT 22, the function UVOC is used differently. Each substitution code comprises the result of running the function UVOC with the input being the constant to be replaced (instead of comprising a call to the function UVOC with the input being the constant to be replaced). In other words, for a given constant C, the substitution code is a different constant C2 computed by executing UVOC with the constant C as input. In this "direct replacement" approach, the "mapping table" of the function UVOC (described below) is created by the client program transformer's CPT 22 use of UVOC. The resulting "mapping table" is then used by the service interface transformer SIT 25 (described below) which embeds the "mapping table" data into the interceptor INTC 26 (described below) for use by the function COVU (described below).

The purpose of the function UVOC is to translate its input data from an expression in the standard linguistic interface SLI 31 of the service to an expression in the unique variant ULI 33. When a unique client program UCP 23 executes, part of its processing comprises assembling one or more units of data into an expression for passing to the interpreter. The data units comprise constant data (part of the program itself) and/or variable data, that is, data that the program obtains during execution, for example, from an input dataset. The result of such processing yields an expression in the unique variant ULI 33 if and only if the resulting expression is a sequence of units comprising one of (a) data returned from a call to UVOC, (b) data that represents constant data in the standard language SLI 31, or (c) data that represents lexical "white space" in the standard language SLI 31. That is, a valid expression of the unique variant ULI 33 can be constructed by a program UCP 23 using variable data, so long as every variable data value is limited to a representation of a constant value in the standard language. Otherwise, an expression is not a valid expression of ULI 33 because it includes inadmissible data (possibly but not necessarily including fragments of the standard language SLI 31). This is to allow partitioning an input string so as to enable distinguishing between SLI 31 data and ULI 33 data.

Figure 18:
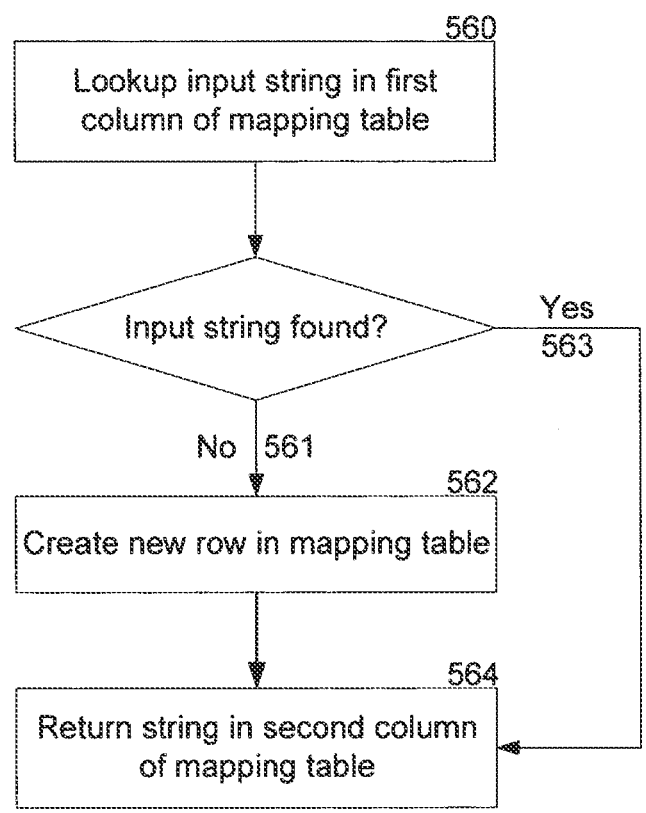
FIG. 18 is a flow diagram illustrating the steps of operation of the function UVOC, according to one embodiment of the present invention.

FIG. 18 is a flow diagram illustrating the steps of operation of the function UVOC, according to one embodiment of the present invention. In FIG. 18, the term "mapping table" refers to state data comprising a table which maps arbitrary strings to randomly generated strings, the table having two columns and a growing number of rows; the term "special characters" refers to characters that are not part of the legal lexical structure of the standard language SLI 31; the term "unique number" refers to a number obtained by executing a pseudo-random number generator or similar source of numbers with the property that there is a very low likelihood that any two generated numbers will be the same.

Lookup 560 the input string in the first column of the "mapping table."

If the input string is not found 561, create 562 a new row in the "mapping table." The first column of the new row is the input string. The second column is a new "mapping string" that begins with a "special character" and is otherwise composed of the sequence of digits of a "unique number" together with zero or more "special characters" interspersed among the digits.

The special characters may be interspersed among the digits according to any deterministic mixing scheme. For example, if the sharp-sign/pound-sign character is not part of SLI 31 then one example would be #12345 while others would be ##1##2##3##4##5## or, in the case where curly braces are not part of SLI 31, {12345} or }1}2}345.

Return 564 the string in the second column of the row that contains the input string in the first column.

It will be observed that every return value from the function UVOC, as specified above, is a string that is not part of SLI 31 because of the use of the "special characters". In an alternative embodiment of the present invention, a UVOC return value may be a string representing constant data in SLI 31 so long as subsequent re-translation distinguishes between (a) constants in SLI 31 that were returned from a call to UVOC, and (b) constants in SLI 31 that were not returned from a call to UVOC.

In an alternative embodiment of the present invention, a new table item is created for each input string, regardless of whether the input has been seen by a previous invocation of UVOC. In both of these embodiments, the unique language is unique (with respect to other unique variants of standard language SLI 31) partly by virtue of the fact that a distinct "unique number" is used in the formulation of each distinct lexical element of the unique language ULI 33. In an alternative embodiment, a unique number is obtained only the first time the UVOC function is called within the unique client program UCP 23, with each new table entry being a distinct derivative of the same unique number, e.g. the unique number followed by the value of a counter incremented for each new table entry.

In the above-described embodiments of the function UVOC, the mapping table is constructed at run-time during a call to UVOC.

In an alternative embodiment, the client transformer CPT 22 adds in the code of the unique client program UCP 23 some additional software which (a) executes during the initialization of the program UCP 23 before a call to UVOC, and (b) generates the mapping table for UVOC. Subsequent calls to UVOC use this pre-built table for lookup of input, in order to return the second element in a table entry that matches the input.

It is an advantageous aspect of the above embodiments that the generation of the unique language ULI 33 occurs when the program UCP 23 executes, and hence does not depend on secrecy of the definition of ULI 33 that is persistent, depending on stored data, etc. Further, each time a given program UCP 23 executes, a different language ULI 33 is generated.

In an alternative embodiment of the present invention, the mapping table is built during the "build phase". The client transformer CPT 22 adds in the data of the unique client program UCP 23 additional data representing a pre-built mapping table. When UCP 23 executes, calls to UVOC use this pre-built table for lookup of input, in order to return the second element in a table entry that matches that input.

In the above-described embodiments of the function UVOC, there is a direct mapping from an input string to a syntactic element of the language ULI 33. That is, each language ULI 33 has no correlation to the syntax of the standard language SLI 31. Rather, the syntax of each language ULI 33 is based on the fragments of the standard language SLI 31 that are embedded in programs CP 21 and their derivative programs UCP 23. Each of these fragments is mapped in an entry in the table for the function UVOC.

In an alternative embodiment of the function UVOC, the syntax of each language ULI 33 is the same as syntax of the standard language SLI 31. The grammar of each language ULI 33 differs from the grammar of the standard language SLI 31 only in the spelling of the keywords. Each language ULI 33 has a unique set of keywords. For example, for a constant value "ELSE IF" representing a fragment of the standard language SLI 31, an earlier embodiment of UVOC might, if given "ELSE IF" as input, return "#12345", whereas the present embodiment of UVOC might return "#12345 #23456" (having the two lexical elements "#12345" and "#23456" separated by white space) with the critical difference that there is one lexical element in the output string for each lexical element in the input string. This substitution per lexical unit applies to keywords of the standard language SLI 31, but in some embodiments may extend to other lexical elements as well. The present embodiment of UVOC may be used in conjunction with any of the earlier embodiments, e.g. in terms of when the "mapping table" is built, how the "unique number" is generated and used, and/or any of the embodiments described above.

In an alternative embodiment of the function UVOC, the syntax of each language ULI 33 can be determined not by the syntax of the standard language SLI 31, nor by a one-to-one mapping between UVOC inputs and outputs, but rather by any repeatable method for determining how to divide a UVOC input into substrings, and having the UVOC output comprise a "mapping string" for each substring.

Figure 19:
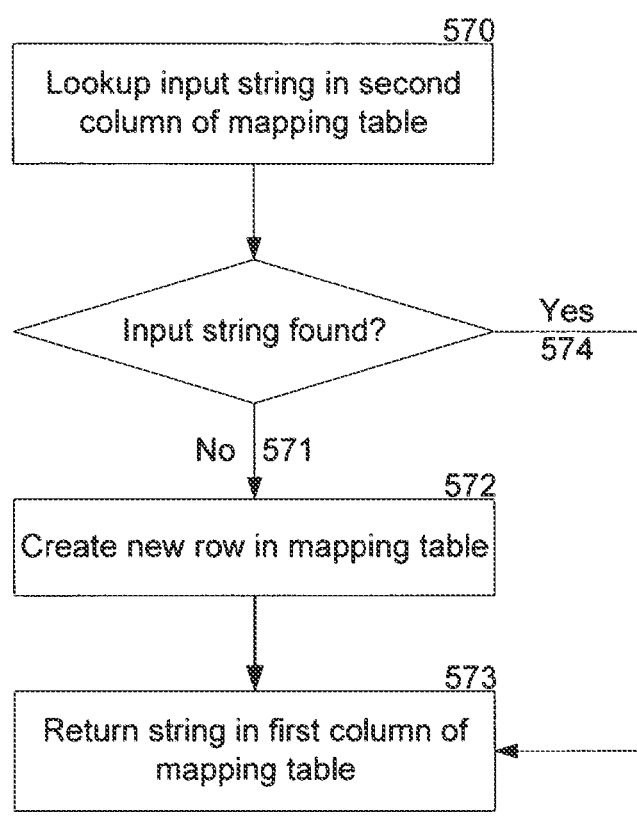
FIG. 19 is a flow diagram illustrating the steps of operation of the function COVU, according to an embodiment of the present invention.

The interceptor INTC 26 depends on a function COVU that is the inverse of the function UVOC. COVU shares the "mapping table" with UVOC, i.e. uses the same state data that UVOC uses and updates. FIG. 19 is a flow diagram illustrating the steps of operation of the function COVU, according to an embodiment of the present invention:

Lookup 570 the input string in the second column of the "mapping table."

If input string is not found 571, create 572 a new row in the "mapping table." The second column of the new row is the input string. The first column is a new "mapping string" as defined in the above description of FIG. 18.

Return 573 the string in the first column of the row that contains the input string in the second column.

It will readily be seen that UVOC translates a fragment of a standard language SLI 31 to a unit of a unique linguistic interface ULI 33, and COVU translates that same unit back to the same fragment. Furthermore, if COVU's input string is not a unit of the unique linguistic interface ULI 33 (i.e. COVU's input string is not found in the second column of any row of the mapping table), then COVU translates that input to a new unit of the unique linguistic interface ULI 33.

The purpose of the service interface transformer SIT 25 is to generate and install the interceptor INTC 26. Different embodiments of the present invention accomplish this in different ways. In one embodiment, the service interface transformer SIT 25 modifies a software implementation of the service SVC 24, such that the interceptor INTC 26 software receives service requests and preprocesses them before calling on the pre-existing service SVC 24 software to process the request that results from the interceptor's INTC 26 pre-processing. In other embodiments, the service SVC 24 is not modified, and the interceptor INTC 26 is installed in the network and/or system-local communication path between the service SVC 24 and one or more clients of the service SVC 24. In another embodiment, the service interface transformer SIT 25 replaces the service SVC 24 entirely with a new implementation having no interceptor per se but rather implementing one or more unique linguistic interfaces ULI 33 used by unique client programs UCP 23.

In one embodiment, an instance of the service interface transformer SIT 25 works with the client transformer CPT 22 to include in unique programs UCP 23 software implementing an interceptor INTC 26 which pre-processes client requests; other means are used to control communication to the service SVC 24 in order to limit effective communication to only unique client programs UCP 23, for example: (a) removing all standard (untransformed) clients from those hosts which have a unique client program UCP 23 installed, and (b) if service resides on a remote host, using network access control to ensure that the only hosts allowed to communicate with the service over the network are such hosts as in (a). In both cases, containment is ensured by preventing subsequent installation of other programs to the hosts.

The interceptor INTC 26 pre-processes requests to a particular service SVC 24 and forwards to the service SVC 24 the result of the pre-processing, wherein the pre-processing determines whether the request is specified in the proper unique linguistic interface ULI 33, and if so re-translates the request (if needed) from a unique linguistic interface ULI 33 to the standard linguistic interface SLI 31.

Figure 20:
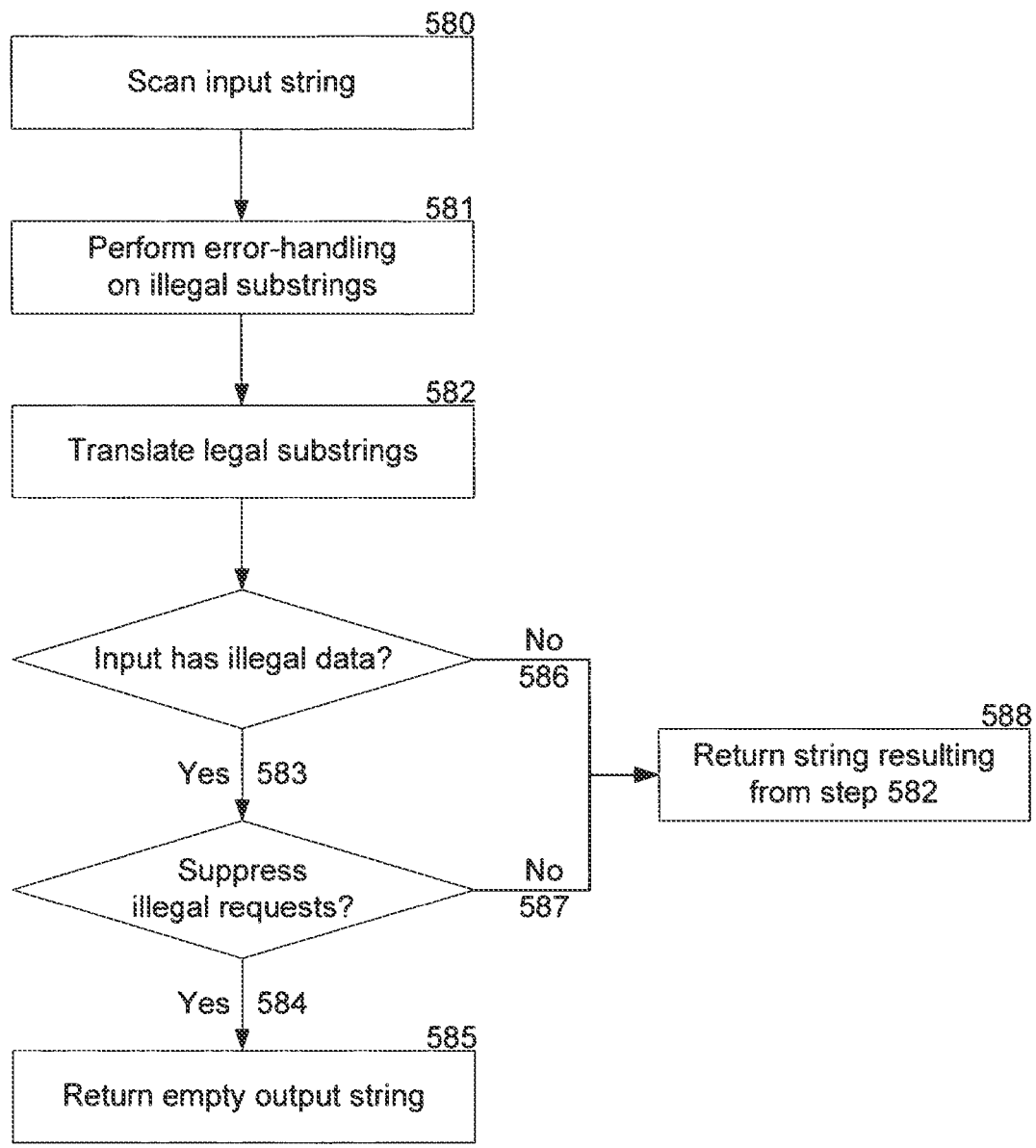
FIG. 20 is a flow diagram illustrating the steps performed by the interceptor, according to an embodiment of the present invention.

FIG. 20 is a flow diagram illustrating the steps performed by the interceptor INTC 26, according to an embodiment of the present invention. Not included in FIG. 20 are configuration steps and initialization steps, which may comprise (but are not limited to) defining a desired error handling behavior and a desired translation behavior.

Scan 580 the input string from beginning to end, performing the following functions:
Identify the legal substrings, which are either:
Strings that represent constants as defined in the standard language SLI 31.
Strings that are a "mapping string" as defined in Table 18.
Strings that are between any two of the above two types of legal substrings, or which are at the beginning or end of the input string, and that consist entirely of "white space" as defined in the standard language SLI 31.
If the input string contains any data that is not a legal substring, and hence "illegal data" then
Identify as an "illegal substring" each sequence of illegal data that is between two legal substrings or that is before the first legal substring or after the last legal substring.
Optionally, coalesce into a single illegal substring each sequence of substrings that is a sequence of illegal substrings and white-space substrings, wherein the coalesced illegal substring contains the data of each of the illegal substrings and the white-space substrings.
For all illegal substrings, if any, perform 581 the error-handling functions currently defined, which may include logging and alerting, and one of several illegal-string-processing functions, which may include:
Replace the illegal string by converting it into a constant string value in the standard language SLI 31. (For example, in some languages, the conversion would be accomplished by prepending a quotation mark to the string, and appending a quotation mark to the string.)
Replace the illegal string by converting into several constant values as defined by the lexical structure of the standard language SLI 31.
Call the function COVU on the illegal string, and replace the illegal string with the string returned from the function COVU.
Remove the illegal string.
Leave the illegal string unchanged.
For all legal substrings that are "mapping strings", if any, perform 582 the translation functions currently defined, which may include:

Leave the "mapping string" unchanged.

Call the function COVU on the "mapping string", and replace the "mapping string" with the string returned from the function COVU.

If the input string comprises 583 any illegal data, and if the current error handling behavior specifies 584 the suppression of erroneous requests, then return 585 the empty string as the output string.

Otherwise 586, 587, return 588 as the output string the result of making the above replacements (if any) in the input string.

Note that although the processing of the interceptor INTC 26 is described in terms of processing an input string, binary representations of a unique linguistic interface ULI 33 are encompassed by the present invention; in cases of binary representations, the interceptor INTC 26 begins processing with a conversion from binary to string form, or parses the binary representation to find individual lexical elements as defined in the above description of FIG. 19.

Note that several different outputs are possible depending on the configuration of desired error-handling and translation functions. Some examples are as follows:

In one embodiment of the service interface transformer SIT 25, the service SVC 24 is modified to implement only one or more unique linguistic interfaces ULI 33; in this case, the desired behavior comprises: leaving legal substrings unchanged, returning an error for requests that contain illegal data, and/or other such action.

In another embodiment of the service interface transformer SIT 25, the desired behavior comprises: re-translating (via the function COVU) the mapping strings back to their original value in the standard language SLI 31, converting illegal strings into constant values of the standard language SLI 31, and passing the resulting output string to the interpreter of the standard language SLI 31.

In another embodiment of the service interface transformer SIT 25, the desired behavior comprises: re-translating (via the function COVU) the mapping strings back to their original value in the standard language SLI 31, translating illegal strings (via the function COVU) into units of the unique language ULI 33, and passing the resulting output string to the interpreter of the standard language SLI 31. Since units of ULI 33 violate the lexical structure of SLI 31, the request will fail as the interpreter rejects the input string as invalid.

Another embodiment of the service interface transformer SIT 25 comprises a "transparent mode", wherein mapping strings are re-translated but illegal strings are left alone, thereby generating a request that would have been produced by a standard client CP 21.

Another embodiment of the service interface transformer SIT 25 comprises a "null mode", wherein no modification is performed. Optionally, this is combined with a UVOC setting wherein the UVOC returns the input as output (i.e. performs a "no-op"), the combination generating a service request that would have been produced by a standard client CP 21.

Another embodiment of the service interface transformer SIT 25 comprises a "test mode", combining the "transparent mode" with the logging of illegal data. In cases where the client and server are being tested with test data known not to include truly illegal data (i.e. illegal data comprising input originating from outside the client program, as opposed to illegal data originating from client and simply due to improper CPT 22 operation), the logging will identify fragments of the standard language resulting from incomplete or erroneous operation of the client program transformer CPT 22 or the function UVOC. Using an input set known not to comprise such truly illegal data helps to identify other illegal data (if any) for testing the effectiveness of CPT 22.

It is an advantageous aspect of the present invention that the combination of the operation of the function UVOC in the unique client UCP 23 together with the operation of the function COVU in the interceptor INTC 26 can be used to defeat a class of usage known as "code insertion attacks". In a code insertion attack, while the expected usage of an application comprises external input limited to constant data, the external input may nevertheless comprise data representing code to be executed when passed to the interpreter of a service, wherein the service is used by the application and has a linguistic interface. In contrast, in the present invention only legitimate standard language fragments pass through the function UVOC and hence through the interceptor INTC 26, while standard language fragments in user input are removed or converted (to constant data or to erroneous input defined in a unique language) so as to prevent interpretation.

It is noted that a form of virtualization is implemented when the desired translation behavior is to re-translate via COVU, and the desired error behavior is to translate via COVU. In this usage, all input to the service (except for constant values of the service's standard language) is subject to transformation via the function COVU's use of the "mapping table." For any data sent from a unique client program to the interpreter of a standard language, the only data that will be correctly processed by the standard language interface comprises data previously translated by UVOC and then re-translated by COVU to the standard language. Data that has not been previously translated will be translated by COVU to a unique-language unit representing illegal input for the standard language interpreter. The "mapping table" for a unique client UCP 23 is analogous in operation to an operating system's virtual memory map for a process. Just as memory references are unavoidably mapped to avoid direct addressing and to generate errors for unmapped addresses, all language interface data are unavoidably mapped to prevent direct interface usage and to generate errors for invalid usage. A process can access the physical memory that has been specifically allocated for it; and analogously a program can use specific expressions in the standard language that have been specifically prepared for use via UVOC. The code that performs the mapping in both cases does not examine or interpret the data mapped, and there is no computation to determine a judgment of legitimacy of data or a decision about authorization of usage.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method to be executed by at least one processor in an electronic environment, comprising:

identifying a first constant data of a first client program, the first constant data expressed in a first grammar type directed to a first linguistic interface of a first service implementation;

determining a substitution code to replace the first constant data, the substitution code indicating an expression in a second grammar type directed to a second linguistic interface of a second service implementation, the expression equivalent to the first constant data;
searching a mapping table having a plurality of arbitrary strings corresponding respectively to a plurality of mapping strings; and
creating a new entry in the mapping table if none of the arbitrary strings of the plurality of arbitrary strings matches an input string of the first constant data, wherein the new entry includes a new arbitrary string matching the input string of the first constant data, wherein a new matching string is generated to correspond to the new arbitrary string, wherein the new matching string is a second constant data created in the new entry as the expression in the second grammar type directed to the second linguistic interface,
wherein the first and second service implementations implement equivalent services, and the first and second linguistic interfaces are distinct.

2. The method of claim 1, wherein the substitution code comprises the second constant data.

3. The method of claim 2, further comprising
identifying a mapping string of the plurality of mapping strings as the second constant data if a corresponding arbitrary string of the plurality of strings matches the input string of the first constant data.

4. The method of claim 1, wherein the substitution code comprises a subroutine call having the first constant data as an argument, wherein the subroutine call returns the second constant data as the expression in the second grammar type directed to the second linguistic interface.

5. The method of claim 1, further comprising generating a second client program including the first client program with the first constant data replaced by the substitution code.

6. A method, comprising:
receiving a request for executing a first program, the first program comprising a first constant data, the first constant data expressed in a first grammar type directed to a first linguistic interface of a first service implementation;
determining a substitution code to replace the first constant data, the substitution code indicating an expression in a second grammar type directed to a second linguistic interface of a second service implementation, the expression equivalent to the first constant data;
generating a second program including the first program with the first constant data replaced by the substitution code; and
executing the second program,
wherein the first and second service implementations implement equivalent services, and the first and second linguistic interfaces are distinct.

7. The method of claim 6, wherein the substitution code comprises a second constant data.

8. The method of claim 7, wherein the determining a substitution code includes:
searching a mapping table having a plurality of arbitrary strings corresponding respectively to a plurality of mapping strings; and
identifying a mapping string of the plurality of mapping strings as the second constant data, the mapping string corresponding to an arbitrary string of the plurality of arbitrary strings, wherein the arbitrary string matches an input string of the first constant data.

9. The method of claim 7, wherein the determining a substitution code includes:
searching a mapping table having a plurality of arbitrary strings corresponding respectively to a plurality of mapping strings; and
creating a new entry in the mapping table if none of the arbitrary strings of the plurality of arbitrary strings matches an input string of the first constant data,
wherein the new entry includes a new arbitrary string matching the input string of the first constant data, and wherein a new matching string is generated to correspond to the new arbitrary string.

10. The method of claim 6, wherein the substitution code comprises a subroutine call having the first constant data as an argument, wherein the subroutine call returns a second constant data as the expression in the second grammar type directed to the second linguistic interface.

11. The method of claim 10, wherein the second constant data is a mapping string of a plurality of mapping strings, the plurality of mapping strings corresponding respectively to a plurality of arbitrary strings in a mapping table;
wherein the mapping string is identified by finding a corresponding arbitrary string of the plurality of arbitrary strings that matches an input string of the first constant data.

12. The method of claim 6, further comprising examining a manifest, the manifest indicating whether the first program is authorized to use the first service implementation.

13. The method of claim 12, further comprising:
determining if an integrity data of the manifest has changed; and
blocking all programs from executing if the integrity data of the manifest has changed.

14. The method of claim 12, further comprising:
determining if an integrity data of the first program in the manifest has changed;
blocking the first program from executing if the integrity data of the first program in the manifest has changed.

15. A method to be executed by at least one processor in an electronic environment, comprising:
identifying a calling code in a first program, the calling code for submitting a service parameter data to a first service implementation having a first linguistic interface configured to interpret requests that conform to a first grammar type;
identifying a first constant data in the first program, wherein the service parameter data is determined using the first constant data via at least one code path in the first program;
defining a substitution code to replace the first constant data, the substitution code indicating an expression in a second grammar type directed to a second linguistic interface of a second service implementation; and
generating a second program, the second program comprising the substitution code,
wherein the first and second service implementations implement equivalent services, and the first and second linguistic interfaces are distinct.

16. The method of claim 15, wherein the substitution code comprises a second constant data.

17. The method of claim 15, wherein the substitution code comprises a subroutine call having the first constant data as an argument, wherein the subroutine call returns a second constant data as the expression in the second grammar type directed to the second linguistic interface.

18. The method of claim 17, wherein the second constant data is a mapping string of a plurality of mapping strings, the plurality of mapping strings corresponding respectively to a plurality of arbitrary strings in a mapping table;
  wherein the mapping string is identified by finding a corresponding arbitrary string of the plurality of arbitrary strings that matches an input string of the first constant data.

19. A system, comprising:
  a memory to store instructions; and
  a processor configured to execute the instructions to:
    identify a first constant data of a first client program, the first constant data expressed in a first grammar type directed to a first linguistic interface of a first service implementation;
    determine a substitution code to replace the first constant data, the substitution code indicating an expression in a second grammar type directed to a second linguistic interface of a second service implementation, the expression equivalent to the first constant data;
    search a mapping table having a plurality of arbitrary strings corresponding respectively to a plurality of mapping strings; and
    create a new entry in the mapping table if none of the arbitrary strings of the plurality of arbitrary strings matches an input string of the first constant data, wherein the new entry includes a new arbitrary string matching the input string of the first constant data, wherein a new matching string is generated to correspond to the new arbitrary string, wherein the new matching string is a second constant data created in the new entry as the expression in the second grammar type directed to the second linguistic interface,
    wherein the first and second service implementations implement equivalent services, and the first and second linguistic interfaces are distinct.

20. The system of claim 19, wherein the substitution code comprises the second constant data.

21. A system, comprising:
  a memory to store instructions; and
  a processor configured to execute the instructions to:
    receive a request for executing a first program, the first program comprising a first constant data, the first constant data expressed in a first grammar type directed to a first linguistic interface of a first service implementation;
    determine a substitution code to replace the first constant data, the substitution code indicating an expression in a second grammar type directed to a second linguistic interface of a second service implementation, the expression equivalent to the first constant data; and
    generate a second program including the first program with the first constant data replaced by the substitution code,
    wherein the first and second service implementations implement equivalent services, and the first and second linguistic interfaces are distinct.

22. The system of claim 21, the processor configured to execute further instructions to:
  search a mapping table having a plurality of arbitrary strings corresponding respectively to a plurality of mapping strings; and
  create a new entry in the mapping table if none of the arbitrary strings of the plurality of arbitrary strings matches an input string of the first constant data,
  wherein the new entry includes a new arbitrary string matching the input string of the first constant data, and wherein a new matching string is generated to correspond to the new arbitrary string.

23. A system, comprising:
  a memory to store instructions; and
  a processor configured to execute the instructions to:
    identify a calling code in a first program, the calling code for submitting a service parameter data to a first service implementation having a first linguistic interface configured to interpret requests that conform to a first grammar type;
    identify a first constant data in the first program, wherein the service parameter data is determined using the first constant data via at least one code path in the first program;
    define a substitution code to replace the first constant data, the substitution code indicating an expression in a second grammar type directed to a second linguistic interface of a second service implementation; and
    generate a second program, the second program comprising the substitution code,
    wherein the first and second service implementations implement equivalent services, and the first and second linguistic interfaces are distinct.

24. The system of claim 23, wherein the substitution code comprises a second constant data.

25. At least one non-transitory computer readable storage medium having instructions stored thereon, the instructions when executed by a processor cause the processor to:
  identify a first constant data of a first client program, the first constant data expressed in a first grammar type directed to a first linguistic interface of a first service implementation;
  determine a substitution code to replace the first constant data, the substitution code indicating an expression in a second grammar type directed to a second linguistic interface of a second service implementation, the expression equivalent to the first constant data;
  search a mapping table having a plurality of arbitrary strings corresponding respectively to a plurality of mapping strings; and
  create a new entry in the mapping table if none of the arbitrary strings of the plurality of arbitrary strings matches an input string of the first constant data, wherein the new entry includes a new arbitrary string matching the input string of the first constant data, wherein a new matching string is generated to correspond to the new arbitrary string, wherein the new matching string is a second constant data created in the new entry as the expression in the second grammar type directed to the second linguistic interface,
  wherein the first and second service implementations implement equivalent services, and the first and second linguistic interfaces are distinct.

26. The at least one non-transitory computer readable storage medium of claim 25, wherein the substitution code comprises a subroutine call having the first constant data as an argument, wherein the subroutine call returns the second constant data as the expression in the second grammar type directed to the second linguistic interface.

27. At least one non-transitory computer readable storage medium having instructions stored thereon, the instructions when executed by a processor cause the processor to:
  receive a request for executing a first program, the first program comprising a first constant data, the first constant data expressed in a first grammar type directed to a first linguistic interface of a first service implementation;
  determine a substitution code to replace the first constant data, the substitution code indicating an expression in a second grammar type directed to a second linguistic interface of a second service implementation, the expression equivalent to the first constant data; and generate a second program including the first program with the first constant data replaced by the substitution code, wherein the first and second service implementations implement equivalent services, and the first and second linguistic interfaces are distinct.

28. The at least one non-transitory computer readable storage medium of claim 27, wherein the substitution code comprises the second constant data.

29. At least one non-transitory computer readable storage medium having instructions stored thereon, the instructions when executed by a processor cause the processor to:

identify a calling code in a first program, the calling code for submitting a service parameter data to a first service implementation having a first linguistic interface configured to interpret requests that conform to a first grammar type;

identify a first constant data in the first program, wherein the service parameter data is determined using the first constant data via at least one code path in the first program;

define a substitution code to replace the first constant data, the substitution code indicating an expression in a second grammar type directed to a second linguistic interface of a second service implementation; and generate a second program, the second program comprising the substitution code, wherein the first and second service implementations implement equivalent services, and the first and second linguistic interfaces are distinct.

30. The at least one non-transitory computer readable storage medium of claim 29, wherein the substitution code comprises a subroutine call having the first constant data as an argument, wherein the subroutine call returns a second constant data as the expression in the second grammar type directed to the second linguistic interface.

* * * * *